US009243131B2

(12) United States Patent
Tamagawa et al.

(10) Patent No.: US 9,243,131 B2
(45) Date of Patent: Jan. 26, 2016

(54) RETARDATION FILM, POLARIZING PLATE AND LIQUID CRYSTAL DISPLAY DEVICE

(75) Inventors: Minori Tamagawa, Hino (JP); Noriyasu Kuzuhara, Kunitachi (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 1005 days.

(21) Appl. No.: 11/787,443

(22) Filed: Apr. 16, 2007

(65) Prior Publication Data

US 2007/0247576 A1    Oct. 25, 2007

(30) Foreign Application Priority Data

Apr. 25, 2006  (JP) ................. 2006-120357

(51) Int. Cl.
| G02F 1/13363 | (2006.01) |
| C08L 1/10 | (2006.01) |
| C08L 1/14 | (2006.01) |

(52) U.S. Cl.
CPC ... *C08L 1/10* (2013.01); *C08L 1/14* (2013.01); *G02F 1/13363* (2013.01); *C08L 2666/26* (2013.01)

(58) Field of Classification Search
CPC ......... C08L 1/10; C08L 1/12; C08L 2666/26; C08L 1/14; G02B 5/3033; G02F 1/133528; G02F 1/13363; G02F 2201/50; G02F 2202/40
USPC .................. 428/1.33; 349/117–122
See application file for complete search history.

(56) References Cited

U.S. PATENT DOCUMENTS

| 2,092,677 | A | * | 9/1937 | Lovett ..................... 106/162.7 |
| 3,057,743 | A | * | 10/1962 | Davis et al. .................. 106/162.7 |
| 3,291,625 | A | * | 12/1966 | Faraone et al. ............ 106/18.18 |
| 3,313,639 | A | * | 4/1967 | Davis et al. ................ 106/162.7 |
| 3,495,998 | A | * | 2/1970 | Rose, Jr. et al. ............ 106/162.7 |
| 2002/0132064 | A1 | | 9/2002 | Kwon et al. |
| 2003/0171458 | A1 | * | 9/2003 | Buchanan et al. ............... 524/32 |
| 2004/0239852 | A1 | * | 12/2004 | Ono et al. ..................... 349/118 |
| 2005/0238820 | A1 | | 10/2005 | Tachibana et al. |
| 2006/0115608 | A1 | * | 6/2006 | Saito et al. ..................... 428/1.3 |
| 2006/0188708 | A1 | * | 8/2006 | Bermel .......................... 428/339 |

FOREIGN PATENT DOCUMENTS

| CN | 1653123 A | 8/2005 |
| EP | 1329747 A1 | 7/2003 |
| EP | 1396738 A1 | 3/2004 |
| JP | 2003-270442 A | 9/2003 |
| JP | 2004-315613 A | 11/2004 |
| JP | 2006-265301 A | 10/2006 |
| JP | 2007-138121 A | 6/2007 |
| JP | 2007-169592 A | 7/2007 |
| TW | I228620 B | 3/2005 |

OTHER PUBLICATIONS

JPO Website Machine English Translation of JP 2004-177642, Yajima, Jun. 24, 2004.*
English Translation by Schreiber Translations, Inc., of JP 2004-177642, Takatoshi Yajima, Jun. 24, 2004.*
Supplemental European Search Report mailed Mar. 15, 2013, which issued in European Patent Application No. 07741598.
Japanese Office Action (Notice of Reasons of Refusal) dated Feb. 7, 2013 (with an English-language translation thereof) for Japanese patent application 2012-141314.
Korean Official Action mailed on Apr. 18, 2013 (along with an English-language translation thereof) for Korean patent application No. 10-2008-7025715.
Japanese Office Action mailed Apr. 24, 2012, which issued in Japanese Patent Application No. 2008-513139, and an English-language translation thereof.
European Office Action dated Jul. 4, 2014 in counterpart European Application No. 07741598.2.
Taiwanese Office Action dated Jun. 19, 2014 in counterpart Taiwanese Application No. 096114303.
Taiwanese Office Action (and English translation thereof) dated Jul. 14, 2015, issued in counterpart Taiwanese Application No. 104100714.

* cited by examiner

*Primary Examiner* — Sophie Hon
(74) *Attorney, Agent, or Firm* — Holtz, Holtz, Goodman & Chick PC

(57) ABSTRACT

A retardation film, contains: a cellulose derivative; and an esterified compound in which all or a part of OH groups in a compounds (A) containing one of a furanose structure and a pyranose structure or in a compound (B) in which 2 to 12 of at lease of a furanose structure and a pyranose structure are bonded, are esterified.

10 Claims, No Drawings

RETARDATION FILM, POLARIZING PLATE AND LIQUID CRYSTAL DISPLAY DEVICE

CROSS-REFERENCE TO RELATED APPLICATION

This application is based on Japanese Patent Application No. 2006-120357 filed on Apr. 25, 2006, in Japanese Patent Office, the entire content of which is hereby incorporated by reference.

BACKGROUND OF THE INVENTION

The present invention relates to a retardation film, a polarizing plate and a liquid crystal display device.

A retardation film is used to realize a view field angle enlargement or a contrast improvement for a liquid crystal display device.

The retardation film has a specific retardation value. When the retardation value fluctuates, a view angle and a color tone vary (deteriorate), especially when being observed from a diagonal direction. Although various kinds of materials are utilized for the retardation film in order to realize various demands, there may be a case that those materials reversibly change for a fluctuation of environment (especially, humidity environment).

For example, in a case of a retardation film in which a layer (an optical anisotropic layer) to express a retardation for a support film is laminated, a TAC film conventionally has been employed as a support coated with a liquid crystal layer. However, it is well known that the TAC film has a retardation value itself (especially, a film thickness direction retardation) and the retardation value fluctuates depending on absorption and desorption of water. In particular, the absorption and desorption of water relies on hydroxyl groups of a cellulose ester. The lower a total substitution degree is, the intense more the absorption and desorption of water becomes.

On the other hand, recently, we made a cellulose derivative film to express a retardation by stretching it in place of a conventional TAC film and further realized a polarizing plate protective film additionally having a function of a retardation film by subjecting it to an alkali saponification process and laminating it onto a PVA polarizer (for example, refer Japanese Unexamined Patent Publication No. 2003-270442). However, although the fluctuation of the retardation value of the polarizing plate protective film due to humidity change is smaller than that of an ordinal TAC film, there is a situation that a further improvement is required.

SUMMARY OF THE INVENTION

An object of the present invention is to provide a retardation film, a polarizing plate and a liquid crystal display device with which a display appearance quality is stable by suppressing the fluctuation of a retardation value due to humidity change as a defect of a conventional cellulose type retardation film.

The above object of the invention can be attained by the following structures.

(1) A retardation film, contains:
 a cellulose derivative; and
 an esterified compound in which all or a part of OH groups in a compound (A) or in a compound (B) are esterified, wherein the compound (A) consists of one of a furanose structure and a pyranose structure, and the compound (B) consists of two to twelve of at least one type of a furanose structure and a pyranose structure bonded in the compound (B).

Here, the retardation film means an optical film having a below-mentioned in-plane retardation value $R_o$ of 20 nm to 500 nm. Further, the optical film has a thickness-direction retardation value $R_t$ of ±400.

(2) In the retardation film described in (1), the cellulose derivative is cellulose ester having a total acyl group substitution degree of 2.0 to 2.8.

(3) In the retardation film described in (2), the total acyl group substitution degree is 2.2 to 2.55.

(4) In the retardation film described in any one of (1) to (3), the retardation film has the following retardation values for light having a wavelength of 590 nm under a condition of temperature of 23° C. and humidity of 55% RH: an in-plane retardation value $R_o$ represented by Formula (i) is 20 to 80 nm, a thickness-direction retardation value $R_t$ represented by Formula (ii) is 100 to 250 nm and a ratio of $R_t/R_o$ is 2.0 to 5.0.

$$R_o=(nx-ny)\times d \qquad \text{Formula (i)}$$

$$R_t=((nx+ny)/2-nz)\times d \qquad \text{Formula (ii)}$$

In the above formulas, nx represents a refractive index in a film in-plane slow axis direction, ny represents a refractive index in a direction perpendicular to the slow axis, nz represents a refractive index in a film thickness direction, and d represents a film thickness (nm).

(5) In the retardation film described in any one of (1) to (4), the retardation film contains 5 to 30% by weight of the esterified compound.

(6) In the retardation film described in (1), the compound (A) is glucose, galactose, mannose, fructose, xylose, or arabinose.

(7) In the retardation film described in (1), the compound (b) is a compound in which 2 to 3 of at least one type of the furanose structure and the pyranose structure are bonded.

(8) In the retardation film described in (1), the compound (b) is a compound having the furanose structure and the pyranose structure.

(9) In the retardation film described in any one of (1) to (5), the compound (B) is lactose, sucrose, nystose, 1F-fructosylnystose, stachyose, maltitol, lactitol, lactulose, cellobiose, maltose, cellotriose, maltotriose, raffinose or kestose.

(10) In the retardation film described in (9), the compound (B) is sucrose.

(11) A polarizing plate, comprises:
 a polarizer; and
 the retardation film described in any one of (1) to (10) and pasted on at least one surface of the polarizer.

(12) A liquid crystal display device, comprises:
 a liquid crystal cell; and
 one of the retardation film described in any one of (1) to (10) and the polarizing plate described in (11).

(13) In the liquid crystal display device of (12), the liquid crystal cell is a VA type liquid crystal cell.

According to the invention, it is possible to provide a retardation film, a polarizing plate and a liquid crystal display device with which a display appearance quality is stable by suppressing the fluctuation of a retardation value due to humidity change as a defect of a conventional cellulose type retardation film.

DETAILED DESCRIPTION OF THE PREFERRED EMBODIMENT

Hereinafter, the best modes of the invention is explained in detail, however, the invention is not limited to them.

As a result that inventor has studied with diligence in view of the above problem, with a retardation film characterized by containing: a cellulose derivative; and an esterified compound in which all or a part of OH groups in a compound (A) containing one of a furanose structure and a pyranose structure or in a compound (B) in which 2 to 12 of at least one type of a furanose structure and a pyranose structure are bonded, are esterified, the inventor found to be able to obtain a retardation film, a polarizing plate and a liquid crystal display device with which a display appearance quality is stable by suppressing the fluctuation of a retardation value due to humidity change, and achieved the present invention.

In the present invention, the term "reversible fluctuation" means that if a fluctuation is within a standard range of a measuring device in a measurement result under the same condition at the first time and the last time in a moisture fluctuation, the fluctuation is deemed as the reversible fluctuation. The reversible fluctuation of the retardation value of the present invention is defined such that a change can be observed by becoming an equilibrium condition with the environment after a film is subjected to a moisture control for 5 hours.

In order to confirm an improved effect in reversible fluctuation in the present invention, it is preferable to conduct a retardation value measurement or a view angle measurement by changing a humidity under a condition that a temperature is kept constant. Further, the reversible fluctuation can be confirmed by conducting a measurement under an ordinary environment (for example, 23° C., 55% RH, etc.) before and after conducting a measurement under a humidity change condition.

In this regard, a retardation value can be measure with an automatic double refractometer (Product name: KOBRA-21ADH, manufactured by Oji Scientific Instruments). However, it is not limited to this.

Hereinafter, each element of the present invention will be explained in detail.

<Cellulose Derivative>

In the present invention, the cellulose derivative having a low birefringence and a positive wavelength dispersion property is used as a desirable organic material for a film for a liquid crystal display.

As a cellulose derivative used for the present invention, cellulose ether, such as methyl cellulose, ethyl cellulose, hydroxyethyl cellulose, hydroxypropyl cellulose, and cyanoethyl cellulose, and cellulose ester, such as triacetyl cellulose (TAC), diacetyl cellulose (DAC), cellulose acetate propionate (CAP), a cellulose acetate butyrate (CAB), cellulose acetate phthalate, cellulose acetate trimellitate, cellulose nitrate may be employed, preferably, the cellulose ester.

Celluloses as raw materials for cellulose derivatives available to this invention can be cotton linter, wood pulp, and kanaf although they are not limited. Cellulose derivatives obtained from these raw materials can be used singly or in combination at arbitrary ratios, but it is preferable to use 50 mass % or more of cotton linter.

The cellulose ester film has a greater modulus of elasticity as its molecular weight increases, but when the molecular weight goes too high, the cellulose ester solution becomes too viscous. This reduces the productivity of the cellulose ester film. The molecular weight (number average molecular weight (Mn)) of cellulose ester is preferably 40000 to 200000 and more preferably 100000 to 200000. The Mw/Mn ratio of cellulose ester used by this invention is preferably less than 4.0 and more preferably 1.4 to 2.3.

The mean molecular weight and molecular weight distribution of cellulose ester can be measured by a fast liquid chromatography. The ratio of mass mean molecular weight (Mw) to number average molecular weight (Mn) can be calculated from the results of measurement.

The measuring condition is as follows:
Solvent: Methylene chloride
Column: Shodex K806, K805, K803G (manufactured by Showa Denko KK). Three columns were used in connection.
Column temperature: 25° C.
Sample concentration: 0.1 mass %
Detector: RI Model 504 (manufactured by GL Science)
Pump: L6000 (manufactured by Hitachi Ltd.)
Flow rate: 1.0 ml/min
Calibration curve: Standard polystyrene STK (manufactured by Tosoh Corporation). Calibration curve using 13 samples of Mw=1,000,000 to 500. 13 samples should preferably be spaced approximately equally.

As a cellulose derivative used for the present invention, a cellulose ester having a below-mentioned total acyl substitution degree of 2.0 to 2.8 is preferable.

More preferable cellulose ester has acyl groups of 2 to 4 carbon atoms (per molecule) as substituents and satisfies Equations (I) and (II) at the same time (where X is the substitution degree of acetyl group and Y is the substitution degree of propionyl group or butyryl group).

$$2.2 \leq X+Y \leq 2.55 \quad \text{Equation (I)}$$

$$0 \leq X \leq 2.1 \quad \text{Equation (II)}$$

Especially, preferable cellulose ester is cellulose acetate propionate of $1.0 \leq X \leq 2.1$, $0.1 \leq Y \leq 1.55$ (where X+Y is the total acyl group substitution degree).

Incidentally, acyl group substitution degree can be determined through a method prescribed in ASTM-D817-96. Portions being not substituted by acyl groups usually exist as hydroxy groups. These cellulose esters can be synthesized by well-known methods.

<Solvent>

The cellulose derivative of this invention is dissolved in a solvent to form a dope. This dope is flow-casted onto a substrate to form a film. Since the solvent must be removed by evaporation after extrusion or flow-casting, the solvent should preferably be volatile.

An organic solvent which has a good solubility of the above cellulose derivatives is called a good solvent and its main effect is to solve the cellulose derivatives. Among the good solvents, organic solvents that are used in large quantity is called a main or primary (organic) solvent.

Typical good solvents are, for example,
ketones such as acetone, methyl ethyl ketone, cyclopentanone, and cyclohexanone,
ethers such as tetrahydrofuran (THF), 1,4-dioxane, 1,3-dioxorane, and 1,2-dimethoxyethane,
esters such as methyl formate, ethyl formate, methyl acetate, ethyl acetate, amyl acetate, and γ-butyrolactone,
methyl cellosolve, dimethyl imidazolynone, dimethyl formamide, dimethyl acetoamide, acetonitrile, dimethyl sulfoxide, sulfolane, nitro ethane, methylene chloride, and acetomethyl acetate.

Among the above solvents, preferable are 1,3-dioxorane, THF, methyl ethyl ketone, acetone, methyl acetate and methylene chloride.

In addition to the above organic solvent, the dope should preferably contain 1 to 40 mass % of alcohol of 1 to 4 carbon atoms (per molecule). Alcohols work as a gelation solvent which gelates a web (a dope film made by flowing the cellulose derivative dope over a support) when the ratio of alcohol in the solvent becomes greater during evaporation of the solvent from the dope flown over a metallic support, strengthen the web, and facilitates separation of the web from the support. Alcohols also work to accelerate dissolution of the cellulose derivative into non-chlorine organic solvent when the ratio of alcohols is less.

As a poor solvent, typical alcohols of 1 to 4 carbon atoms (per molecule), more concretely, methanol, ethanol, n-propanol, iso-propanol, n-buthanol, sec-buthanol, tert-buthanol, and propylene glycol monomethyl ether are listed. Among these, ethanol is preferable because it excels at stability of dope and has a comparatively-low boiling point, good drying property, and little toxicity. These organic solvents are called poor solvents because they have no ability to dissolve cellulose derivatives.

The most preferable solvent which can satisfy the above conditions and dissolve cellulose derivatives at high concentration is a mixture of methylene chloride and ethyl alcohol whose ratio is in the range of 95:5 to 80:20 or a mixture of methyl acetate and ethyl alcohol whose ratio is in the range of 60:40 to 95:5.

<Additives>

The retardation film of this invention can contain a plasticizer which gives workability, flexibility, and damp-proof to the film, an ultraviolet absorbent which gives an ultraviolet absorbing function to the film, an antioxidant which prevents deterioration of the film by oxidation, fine particles (matte material) which gives a slidability to the film, a retardation controller which controls the film retardation, and other additives.

<<Compound Having a Furanose Structure or a Pyranose Structure to be Used in the Invention>>

A retardation film of the present invention is characterized by containing: a cellulose derivative and an esterified compound in which all or a part of OH groups in a compound (A) having one of a furanose structure and a pyranose structure or in a compound (B) in which two to twelve of at least one type of a furanose structure and a pyranose structure are bonded, are esterified.

As referable examples of the compound (A) and the compound (B), for example, the following compounds can be listed, however, the present invention is not limited to those compounds.

As referable examples of the compound (A), glucose, galactose, mannose, fructose, xylose, and arabinose can be usable.

As referable examples of the compound (B), lactose, sucrose, nystose, 1F-fructosylnystose, stachyose, maltitol, lactitol, lactulose, cellobiose, maltose, cellotriose, maltotriose, raffinose and kestose can be usable. In addition, gentiobiose, gentiotriose, gentiotetraose, xylotriose, and galactosyl-sucrose may be employed.

Among the compound (A) and the compound (B), a compound having both of the furanose structure and the pyranose structure is preferable. As the compound having both of the furanose structure and the pyranose structure, sucrose, kestose, nystose, 1F-fructosylnystose, and stachyose may be usable, in particular, sucrose can be preferably usable.

In the present invention, an esterified compound of each of the compound (A) and the compound (B) may be referred as a sugar ester compound.

Monocarboxylic acid to be used to esterify all or a part of OH groups of the compound (A) and the compound (B), is not specifically limited and known an aliphatic monocarboxylic acid, an alicyclic monocarboxylic acid and an aromatic monocarboxylic acid can be used. The monocarboxylic acid may be used singly or in combination of two or more kinds thereof.

Examples of preferable aliphatic monocarboxylic acid include a saturated fatty acid such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and a unsaturated fatty acid such as undecylic acid, oleic acid, sorbic acid, linolic acid, linolenic acid, arachidonic acid and octenic acid.

As examples of preferable aliphatic carboxylic acid, cyclopentene carboxylic acid, cyclohexane carboxylic acid, cycloctane carboxylic acid and derivatives thereof can be cited.

Examples of the aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilic acid, biphenyl carboxylic acid, naphthalene carboxylic acid, tetralin carboxylic acid and derivatives thereof. More concretely, xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, p-coumaric acid may be employed. Among them, benzoic acid is particularly preferable.

Among the esterified compound (sugar ester compound) of the compound (A) and the compound (B), an acetylated compound in which acetyl groups are introduced by esterification, is preferable.

Details of the production method of the above acetylated compounds are described in Tokkai Hei 8-245678.

In addition to the esterified compound of the compound (A) and the compound (B), an esterified compound of oligosaccharide can be employed as an esterified compound of a compound in which three to twelve of at least one type of a furanose structure and a pyranose structure are bonded.

The oligosaccharide can be produced by acting a ferment such as amylase to starch, cane sugar and so on. As a oligosaccharide usable for the invention, marthe oligosaccharide, isomarthe oligosaccharide, fructo oligosaccharide, galact oligosaccharide, and xylo oligosaccharide may be listed.

The oligosaccharide can be acetylated with the same method as that for the above compositions (A) and (B).

Next, a production example of an estrified compound is described.

Two hundreds ml of acetic anhydride was dropped into a solution in which 100 ml of pyridine was added into 29.8 g, 166 mmol of glucose and a reaction among them was conducted for 24 hours. Subsequently, the resultant solution was condensed with an evaporator and the condensed solution was put in iced water. After leaving it alone for one hour, the solution was filtered with a glass filter so as to separate a solid and water, and then the solid on the glass filter was dissolved with chloroform, and the solution is separated with chilled water until the solution became neutrality. After separating an organic layer, it was dried with anhydrous sodium sulfate. Further, after removing the anhydrous sodium sulfate by filtration, chloroform was removed with an evaporator, and then conducting drying under reduced pressure, whereby glucose penta acetate (58.8 g, 150 mmol, 90.9%) was obtained.

Incidentally, the above monocarboxylic acid can be used instead of the above-mentioned acetic anhydride.

Concrete examples of the esterified compound (a sugar ester compound) of the present invention are listed below but the invention is not limited to them.

Compound 1

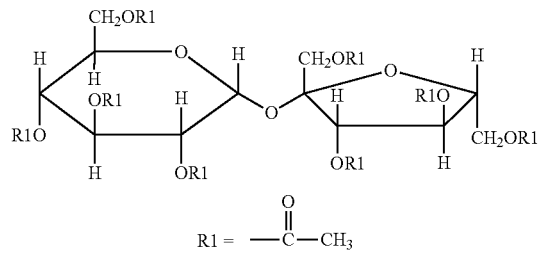

Compound 2

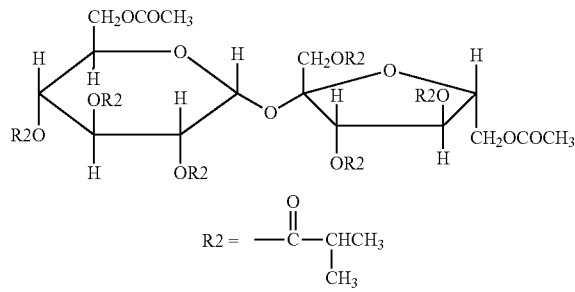

Compound 3

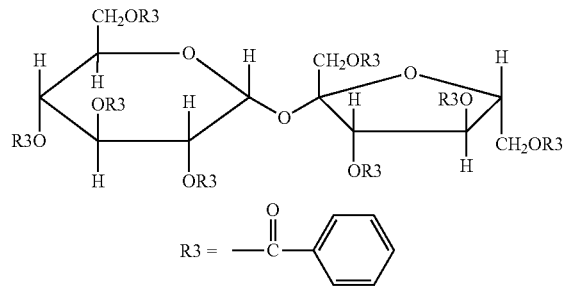

Compound 4

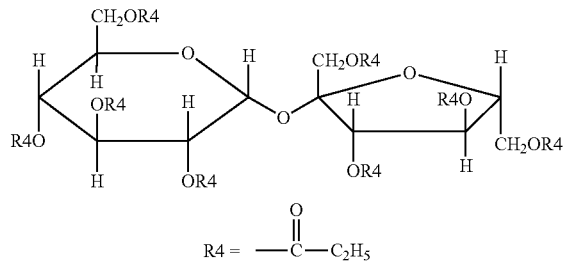

Compound 5

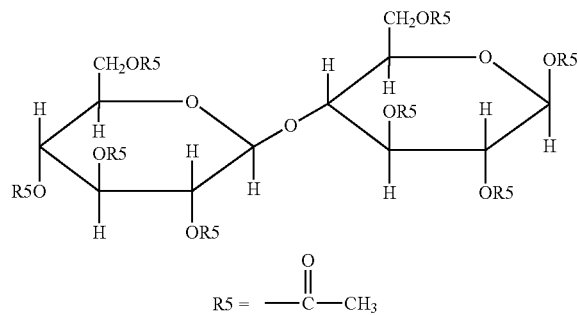

Compound 6

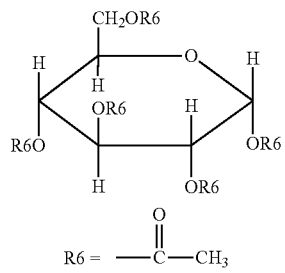

Compound 7

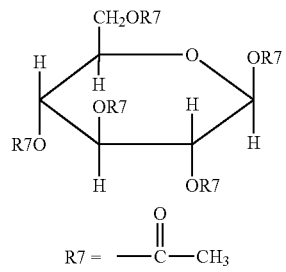

Compound 8

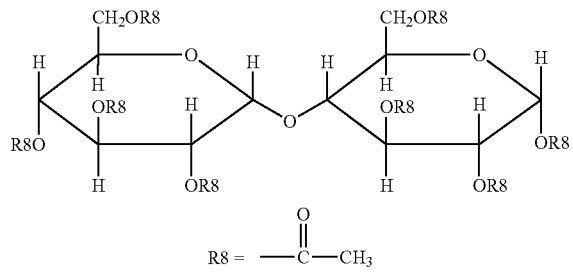

-continued
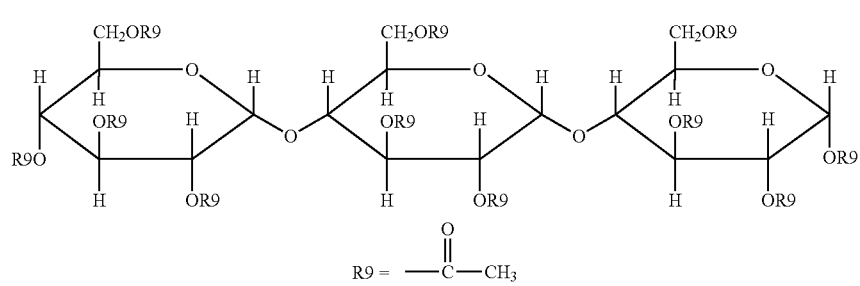
Compound 9
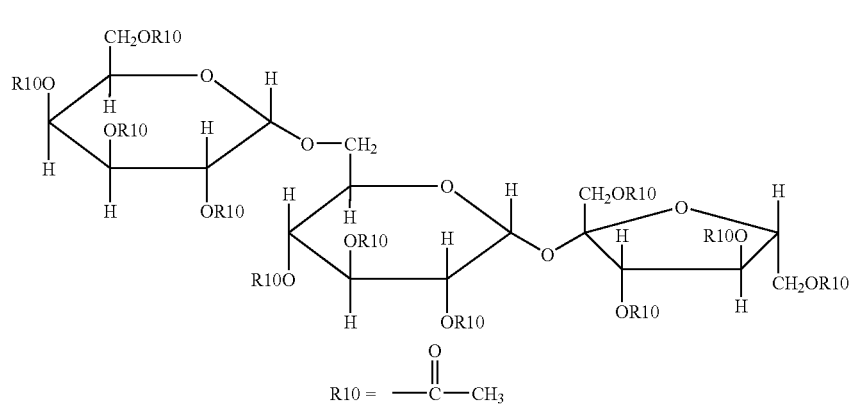
Compound 10
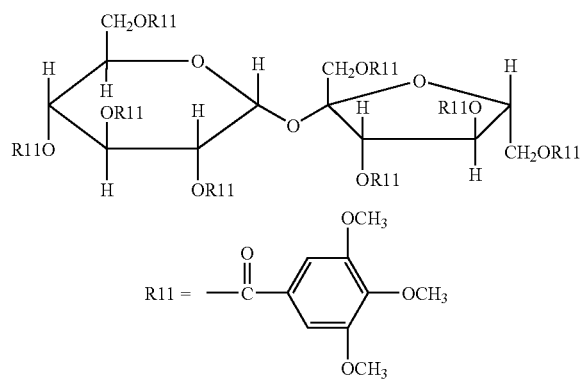
Compound 11
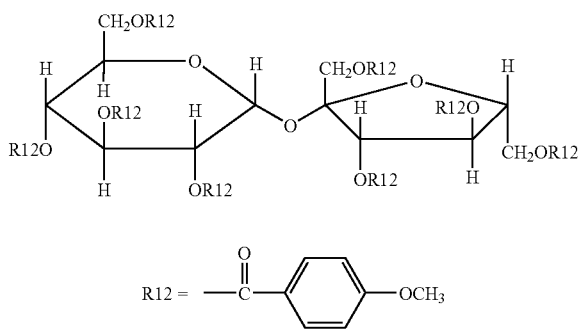
Compound 12
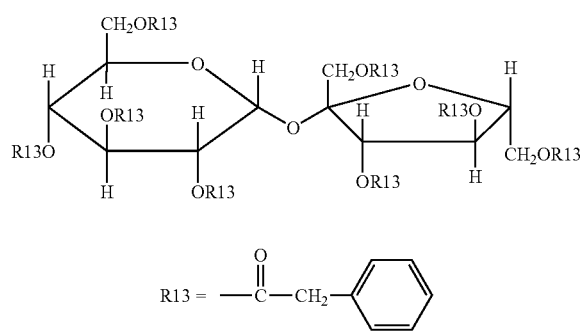
Compound 13
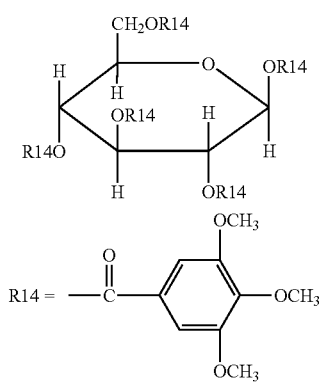
Compound 14

-continued
Compound 15
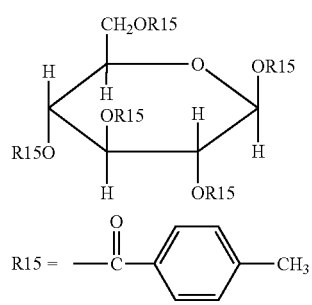
Compound 16
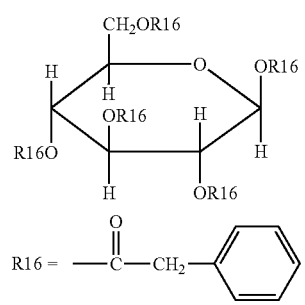
Compound 17
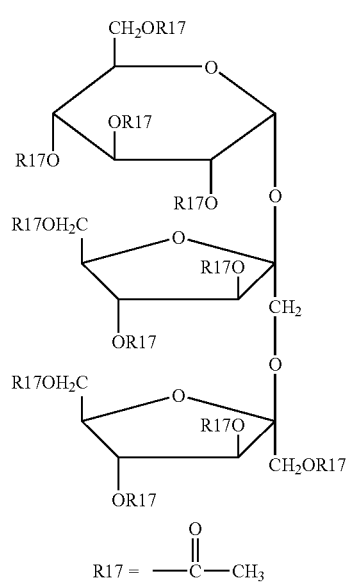
Compound 18
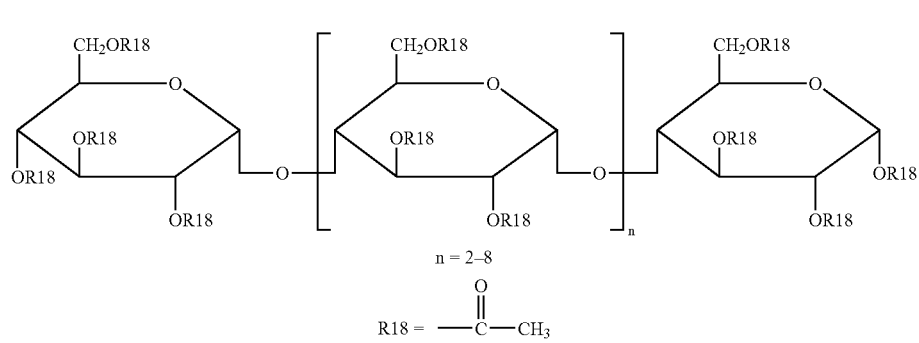
Compound 19
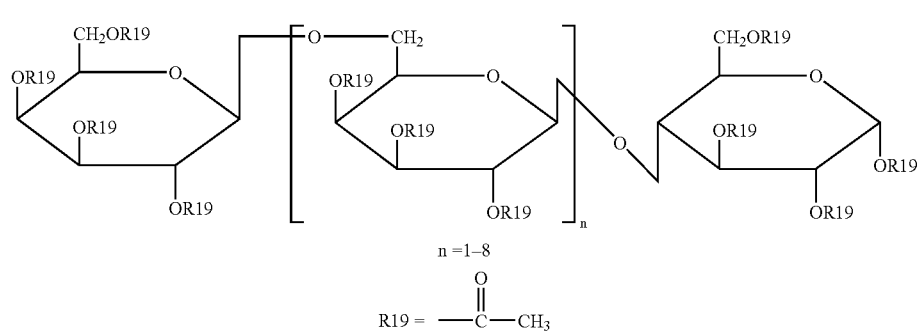

Compound 20
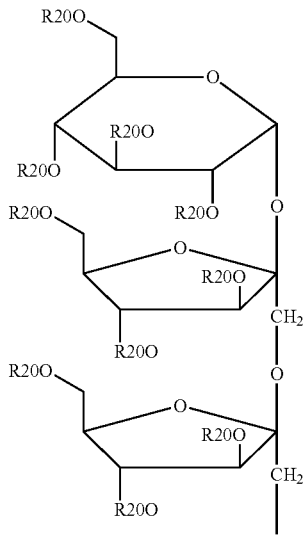
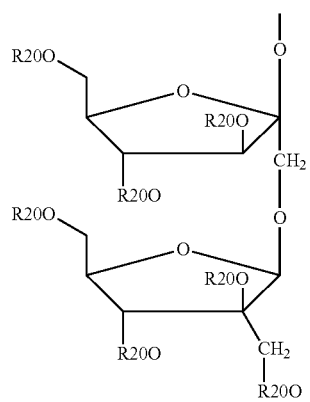
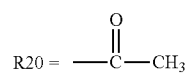
Compound 21
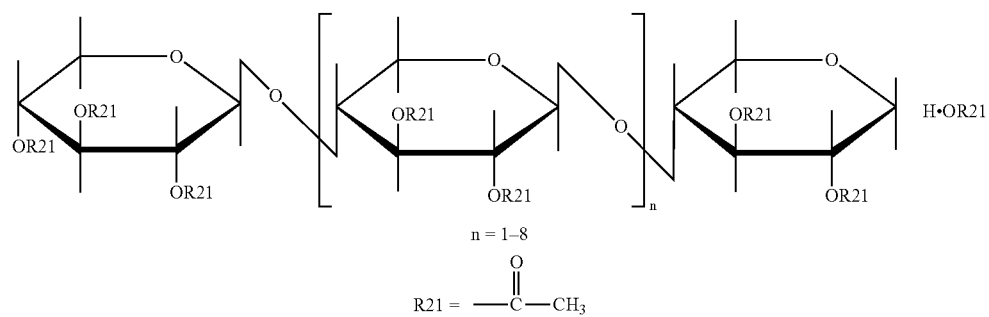

-continued

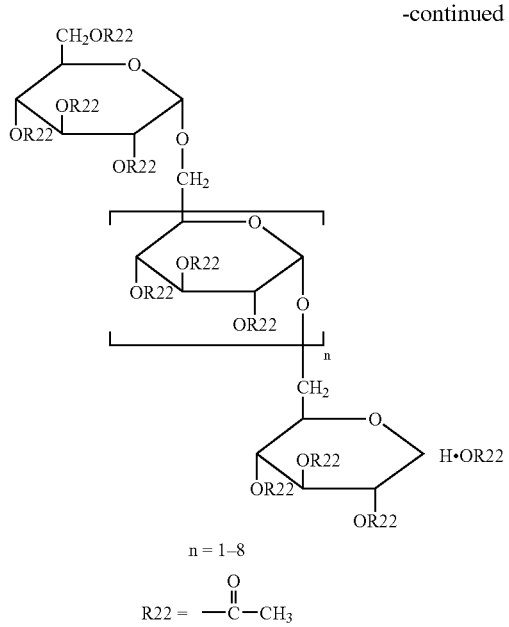

n = 1–8

R22 = 

In order to stabilize a display appearance quality, the retardation film of the invention preferably contains an esterified compound in which all or a part of OH groups in a compound (A) consisting of one of a furanose structure or in a compound (B) consisting of two to twelve of at least one type of a furanose structure and a pyranose structure which are bonded are esterified, in an amount of 1 to 30% by weight, preferably from 5 to 30% by weight. By containing the esterified compound within the above range, the superior effects of the present invention can be expressed, and also bleed-out can be avoided.

Further, the cellulose derivative and the esterified compound in which all or a part of OH groups in a compound (A) consisting of one of a furanose structure or in a compound (B) consisting of two to twelve of at least one type of a furanose structure and a pyranose structure which are bonded are esterified, can be used together with other plasticizers.

Typical plasticizers are phosphoric ester plasticizer, phthalic ester plasticizer, trimellitic ester plasticizer, pyromellitic plasticizer, polyvalent alcohol plasticizer, glycolate plasticizer, citrate ester plasticizer, fatty acid ester plasticizer, carboxylic ester plasticizer, and polyester plasticizer. Particularly, for effect of this invention, polyvalent alcohol plasticizers and ester plasticizers are preferable. Substantially, the film of this invention should preferably contain a polyvalent alcohol ester plasticizer and an aromatic end ester plasticizer to be explained later.

A polyalcohol ester consists of an ester of an aliphatic polyalcohol having a valence of two or more and monocarboxylic acid, and preferably includes an aromatic ring or a cycloalkyl ring in a molecule.

A polyalcohol used in the present invention is represented by formula (2)

$$R_1\text{—}(OH)_n \quad \text{Formula (2)}$$

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof. More concretely, xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, p-coumaric acid may be employed. Among them, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups.

Specific example of polyalcohol esters are shown below:

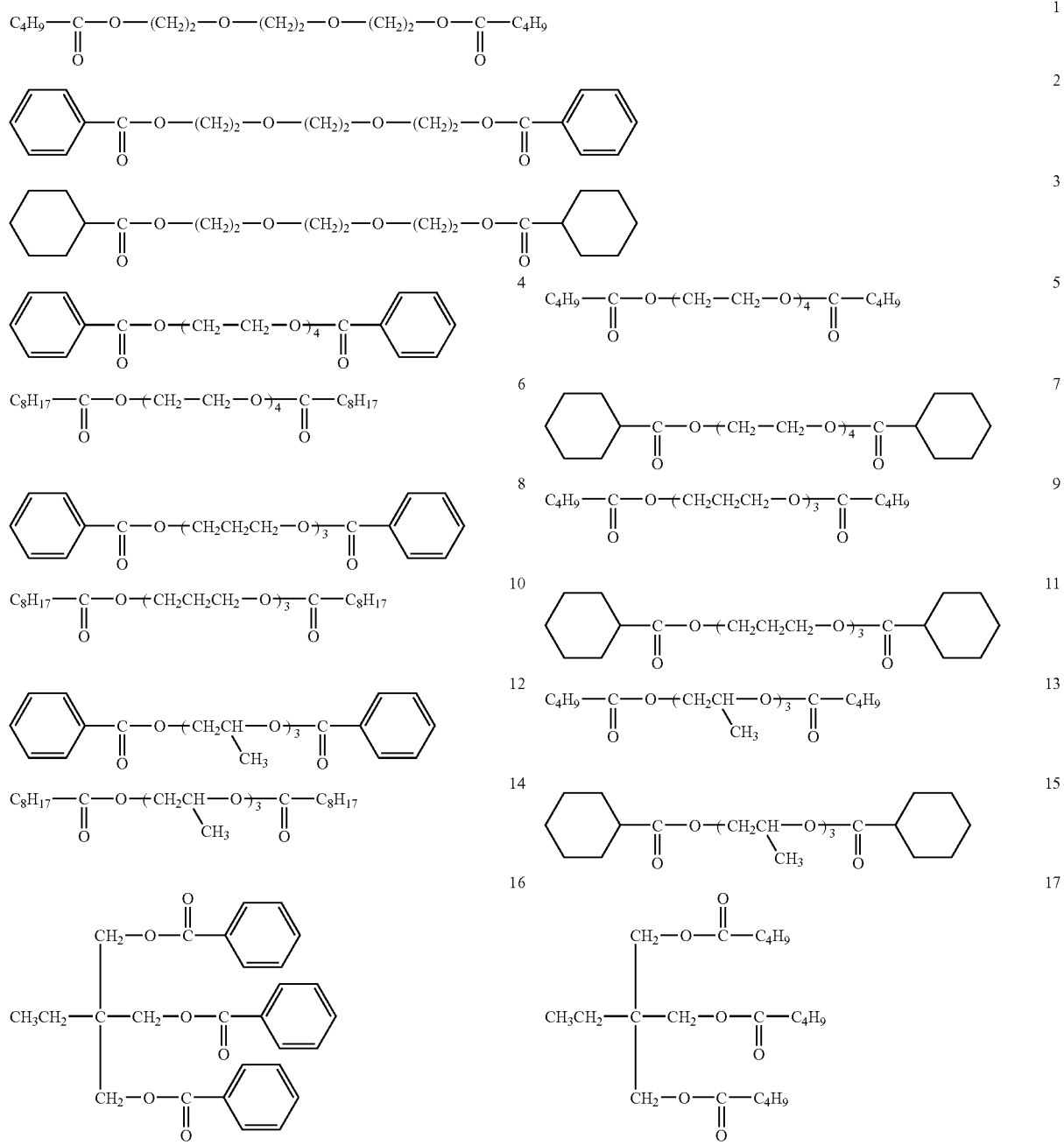

-continued
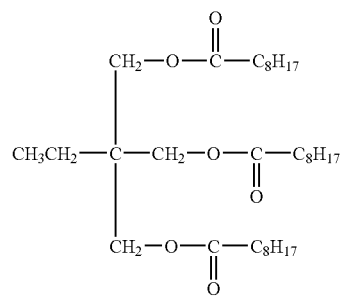
18
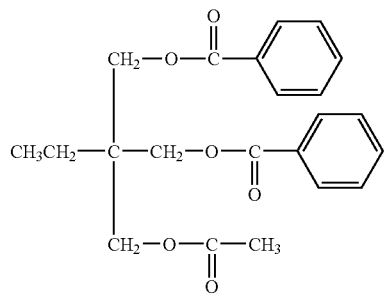
19
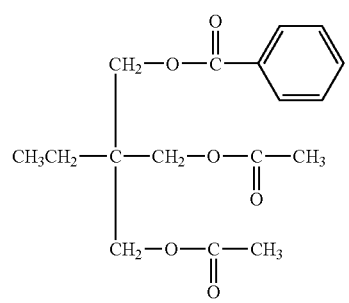
20
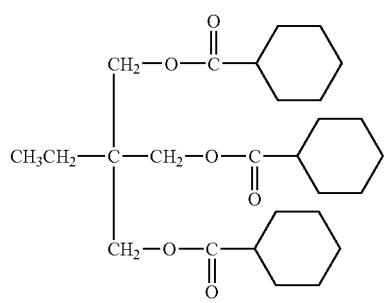
21
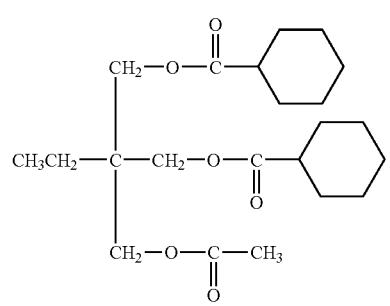
22
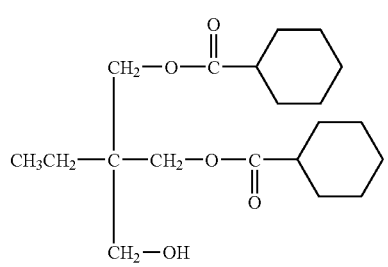
23
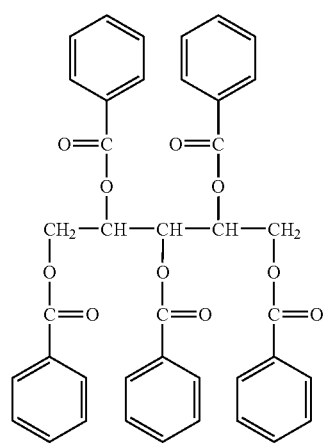
24
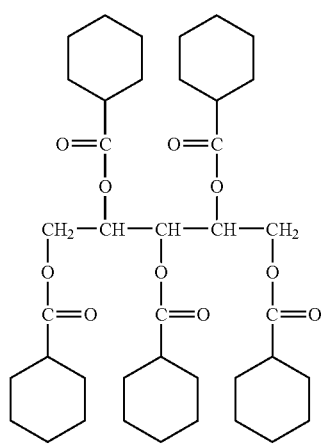
25

-continued
26
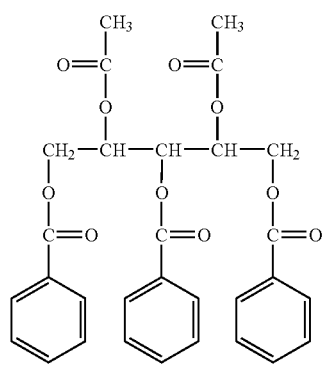
27
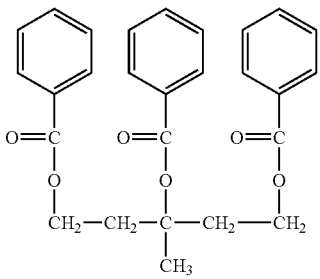
28
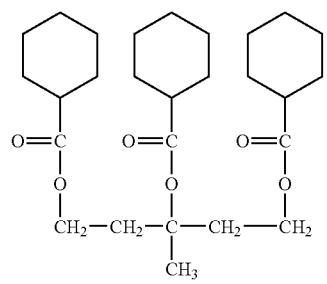
29
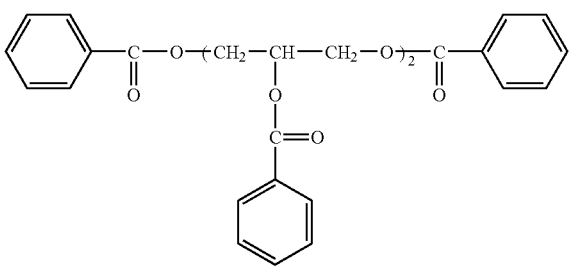
30
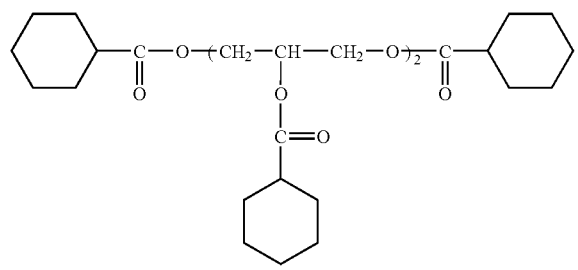
31
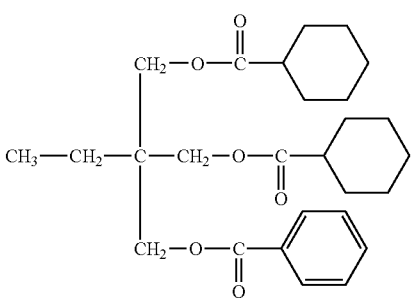
32
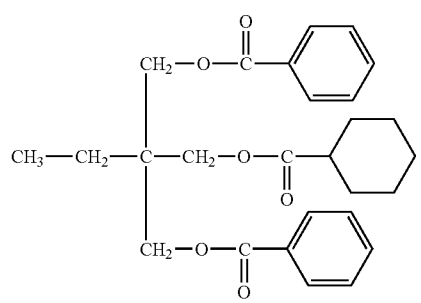
33
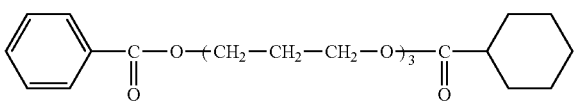
34
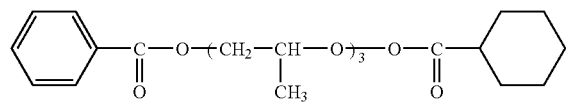
35
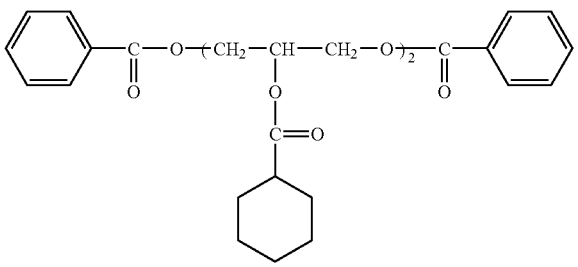

In the present invention, polycarboxylic acid ester compound can be used preferably.

The polycarboxylic acid ester compound in the present invention is an ester of a polycarboxylic acid having a valence of 2 or more, preferably 2 through 20, and an alcohol. The aliphatic polycarboxylic acid preferably has a valence of 2 through 20. The aromatic polycarboxylic acid and alicyclic polycarboxylic acid preferably has a valence of 3 through 20.

The polycarboxylic acid used in the present invention is preferably the compound expressed by Formula (3).

$$R_2(COOH)_m(OH)_n \qquad \text{Formula (3)}$$

In Formula (3), $R_2$ denotes an organic group having a valence of (m+n), m represents a positive integer of 2 or more, n shows an integer of 0 or more, COOH group shows the carboxyl group, and the OH group represents the alcoholic or phenolic hydroxyl group.

The following shows the examples of the preferred polycarboxylic acid, however, the present invention is not limited thereto: aromatic polycarboxylic acid having a valence of 3 or more such as trimellitic acid, trimesic acid and pyromellitic acid, and the derivative thereof; aliphatic polycarboxylic acid such as succinic acid, adipic acid, azelaic acid, sebacic aid, oxalic acid, fumaric acid, maleic acid and tetrahydrophthalic acid; and oxypolycarboxylic acid such as tartaric acid, tartronic acid, malic acid and citric acid. Use of oxypolycarboxylic acid is particularly preferred for the improved retentivity.

There is no limitation for the alcohol used for the polycarboxylic acid ester compound of the present invention. Commonly known alcohol and phenols can be utilized. For example, preferably used is an aliphatic saturated alcohol or an aliphatic unsaturated alcohol having 1 through 32 carbon atoms which has a straight chain or a side chain. The number of carbon atoms is preferably 1 through 20 and more preferably 1 through 10. Examples of the alcohol having 1 to 10 carbon atoms include methanol, ethanol, 1-propanol, 2-propanol, 1-butanol, 2-butanol, t-butanol, 1-pentanol, 2-methyl-2-butanol, cyclohexanol, 2-flulorethanol, 2,2,2-trifluoroethanol, 2,2,3,3-tetrafluoro-1-propanol, and benzyl alcohol. Also preferable are, for example: alicyclic alcohols such as cyclopentanol and cyclohexanol or a derivative thereof; and aromatic alcohols such as benzyl alcohol and cinnamyl alcohol or derivatives thereof.

When the oxypolycarboxylic acid is used as the polycarboxylic acid, the alcoholic or phenolic hydroxyl group of oxypolycarboxylic acid is preferably subjected to esterification by a monocarboxylic acid. The following substances can be listed as examples of preferred monocarboxylic acids, however, the present invention is not limited thereto:

The fatty acid having 1 through 32 carbon atoms which has a straight chain or a branched chain is preferably used as the aliphatic monocarboxylic acid. In this case, the number of carbon atoms is more preferably 1 through 20, still more preferably 1 through 10.

The preferably used aliphatic monocarboxylic acid is exemplified by saturated fatty acids such as acetic acid, propionic acid, butyric acid, valeric acid, caproic acid, enanthic acid, caprylic acid, pelargonic acid, caprylic acid, 2-ethylhexane carboxylic acid, undecylic acid, lauric acid, tridecylic acid, myristic acid, pentadecylic acid, palmitic acid, heptadecylic acid, stearic acid, nanodecanoic acid, arachic acid, behenic acid, lignoceric acid, cerotic acid, heptacosanoic acid, montanoic acid, melissic acid and lacceric acid; and unsaturated fatty acids such as undecylenic acid, oleic acid, sorbic acid, linolic acid, linolenic acid and arachidonic acid.

Examples of a preferably used alicyclic monocarboxylic acid include: cyclopentane carboxylic acid, cyclohexane carboxylic acid, cyclooctane carboxylic acid, and derivatives thereof.

Examples of a preferably used aromatic monocarboxylic acid include: compounds having a benzene ring of a benzoic acid in which an alkyl group is introduced such as benzoic acid and toluic acid; aromatic monocarboxylic acids having two or more benzene rings such as biphenylcarboxylic acid, naphthalene carboxylic acid and tetraphosphide carboxylic acid; and the derivatives thereof. More concretely, xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, β-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, p-coumaric acid may be employed. Among them, acetic acid, propionic acid and benzoic acid are specifically preferred.

There is no particular limitation for the molecular weight of the polycarboxylic acid ester compound. The preferred molecular weight is in the range from 300 through 1000. The range from 350 through 750 is more preferred. The greater molecular weight is more advantageous in improving the retentivity, while smaller molecular weight is more advantageous in improving the moisture permeability, miscibility with cellulose ester.

One type of alcohol or a mixture of two or more types can be used in the polycarboxylic acid ester of the present invention.

The acid number of polycarboxylic acid ester compound used in the present invention is preferably 1 mg KOH/g or less, more preferably 0.2 mg KOH/g or less. If the acid number is kept within the aforementioned range, the change in retardation due to environment can be preferably suppressed.

Although examples of an especially desirable multivalence carboxylate compound are shown below, the present invention is not limited to these examples. For example, triethyl citrate, tributyl citrate, acetyl triethyl citrate (ATEC), acetyl tributyl citrate (ATBC), benzoyl tributyl citrate, acetyl triphenyl citrate, acetyl tri benzyl citrate, dibutyl tartrate, tartaric acid diacetyl dibutyl, trimellitic acid tributyl, pyromellitic acid tetra-butyl, etc. may be listed.

The ester plasticizer used in the present invention is not specifically limited, however, an ester plasticizer which has an aromatic ring or a cycloalkyl ring in the molecule are applicable. For example, an ester plasticizer represented by the following Formula (4) are preferably used:

$$B\text{-}(G\text{-}A)_n\text{-}G\text{-}B \qquad \text{Formula (4)}$$

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (1) is structured by benzene monocarboxylic acid group represented with B, an alkylene glycol group or an oxyalkylene glycol group or an aryl glycol group represented with G, and an alkylene dicarboxylic acid group or an aryl dicarboxylic acid group represented with A and is prepared through a reaction similar to the preparation reaction of a common polyester plasticizer.

Examples of a benzene monocarboxylic acid component of the ester plasticizer of the present invention include: xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, p-coumaric acid, benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols. Since alkylene glycol having carbon atoms of 2-12 is especially excellent in compatibility with cellulose ester, it is especially desirable.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the ester plasticizer used in the present invention is preferably 250-2000, and more preferably 300-1500. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

Examples of a synthetic method of an aromatic terminal ester plasticizer are shown below:

<Sample No. 1 (Aromatic Terminal Ester Sample)>

In a container, 410 parts of phthalic acid, 610 parts of benzoic acid, 737 parts of dipropylene glycols and 0.40 parts of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to 100 Pa and, finally, to $4.0\times10^2$ Pa at 200-230° C., while the distillate was removed. The product was filtered to obtain an aromatic terminal ester type plasticizer having the following features:

Viscosity (25° C., mPa·s): 43400

Acid value: 0.2

<Sample No. 2 (Aromatic Terminal Ester Sample)>

An aromatic terminal ester having the following features was prepared in the same manner as Sample No. 1 except that 410 parts of phthalic acid, 610 parts of benzoic acid, 341 parts of ethylene glycol and 0.35 parts of tetra-isopropyl titanates (as a catalyst) were used.

Viscosity (25° C., mPa·s): 31000

Acid value: 0.1

<Sample No. 3 (Aromatic Terminal Ester Sample)>

An aromatic terminal ester having the following features was prepared in the same manner as Sample No. 1 except that 410 parts of phthalic acid, 610 parts of benzoic acid, 418 parts of 1,2-propanediol and 0.35 parts of tetra-isopropyl titanates (as a catalyst) were used.

Viscosity (25° C. mPa·s): 3800

Acid value: 0.05

>Sample No. 4 (Aromatic Terminal Ester Sample)>

An aromatic terminal ester having the following features was prepared in the same manner as Sample No. 1 except that 410 parts of phthalic acid, 610 parts of benzoic acid, 418 parts of 1,3-propanediol and 0.35 parts of tetra-isopropyl titanates (as a catalyst) were used.

Viscosity (25° C., mPa·s): 37000

Acid value: 0.05

Although concrete compounds of the aromatic terminal ester type plasticizer according to the present invention are shown below, the present invention is not limited to these.

(1)

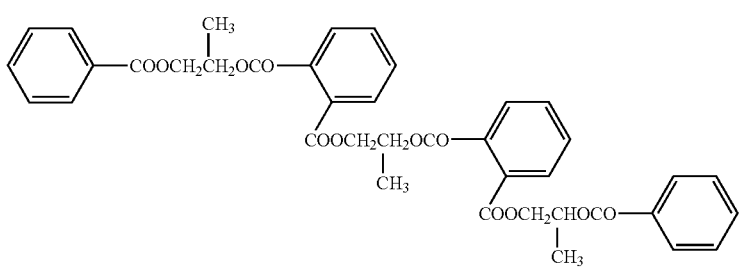

Mw: 696

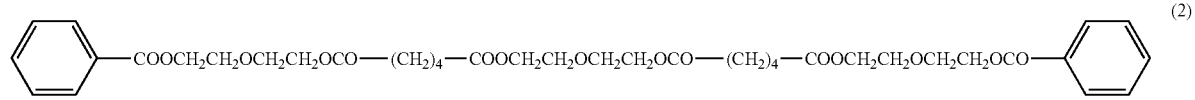
(2)
Mw: 746
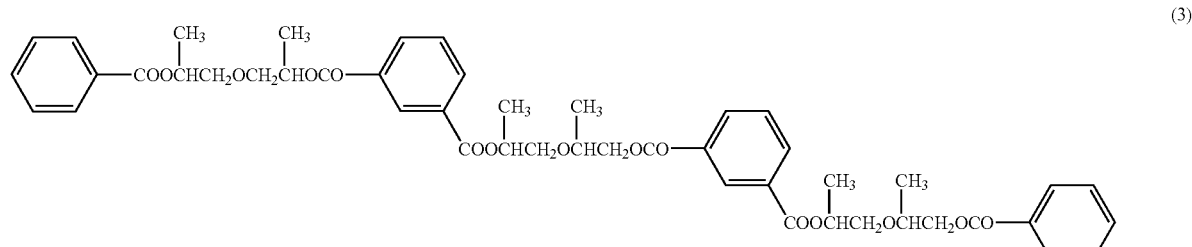
(3)
Mw: 830
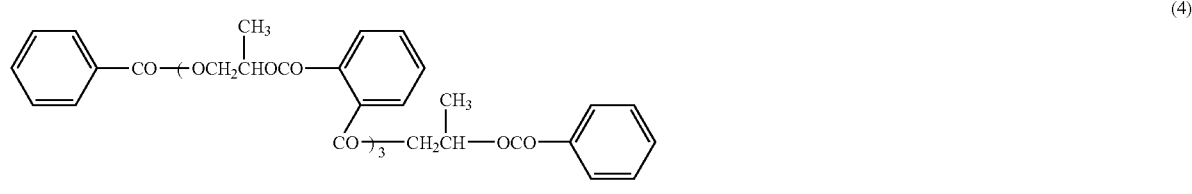
(4)
Mw: 886
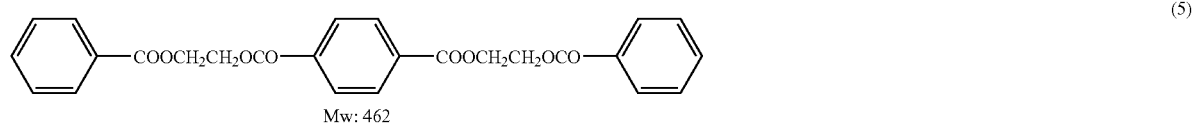
(5)
Mw: 462
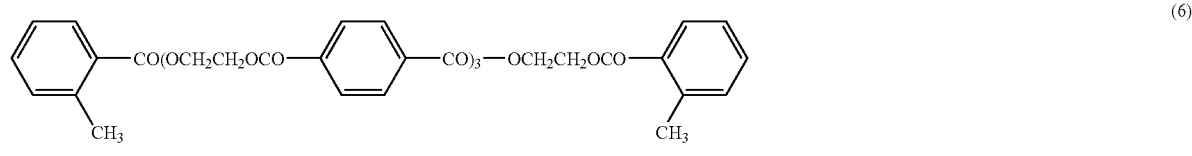
(6)
Mw: 874
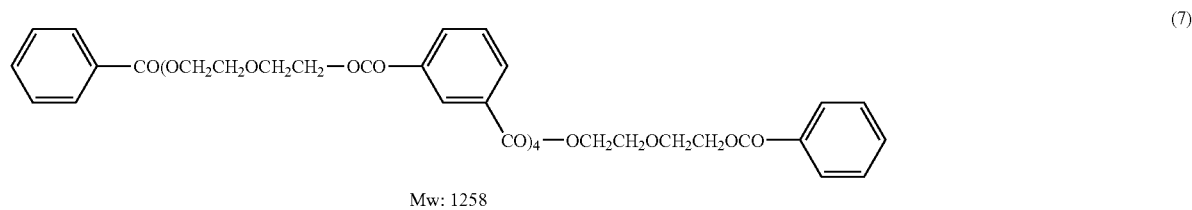
(7)
Mw: 1258
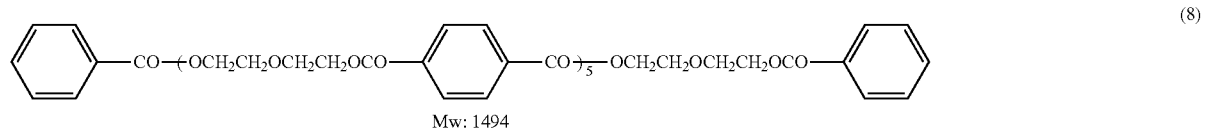
(8)
Mw: 1494
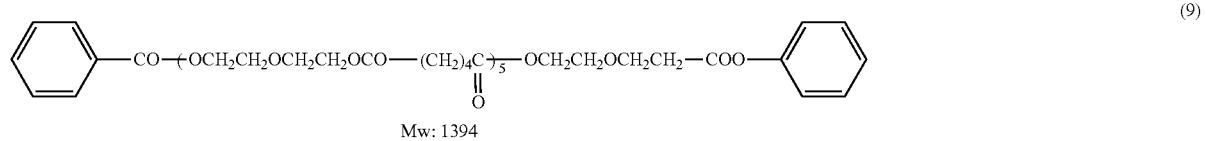
(9)
Mw: 1394
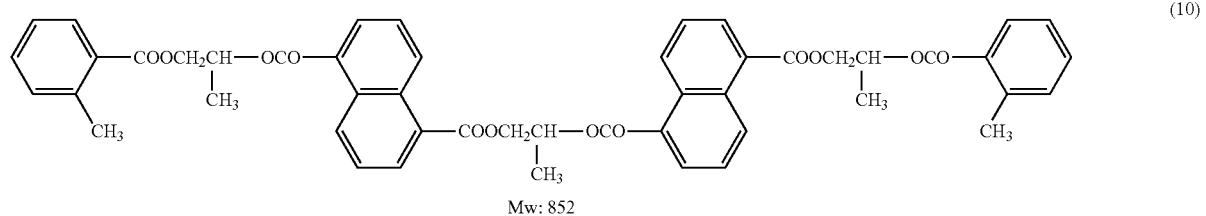
(10)
Mw: 852

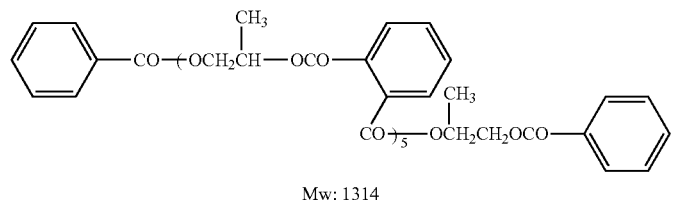

Mw: 1314

(11)

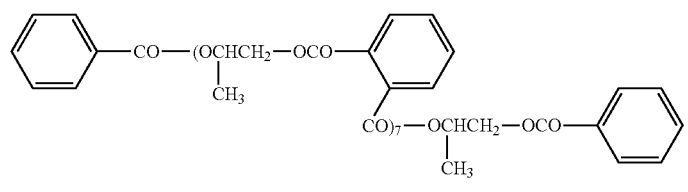

Mw: 1726

(12)

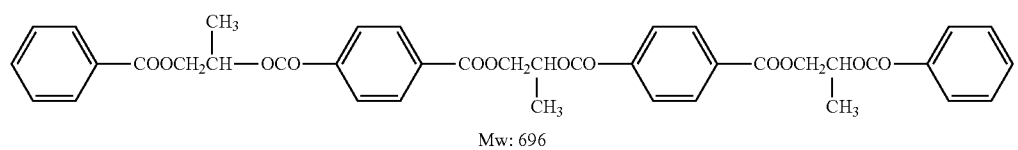

Mw: 696

(13)

These plasticizers can be used independently or as a mixture of two or more. As a used amount of plasticizer, an amount of 1% or less by mass to a cellulose derivative is not preferable, because there are few effects of reducing the water vapour permiability of a film, and when the amount exceeds 20% by mass, a plasticizer bleeds out from a film and the physical properties of a film deteriorate.

Accordingly, the amount of 1 to 20% by mass may be preferable, 6 to 16% more preferable and 8 to 13% still more preferable.

(Ultraviolet (UV) Absorber)

It is desirable that a ultraviolet-ray absorbing ability is given to various optical films, such as a polarizer protection film, a retardation film, and an optical compensation film, from a viewpoint of deterioration prevention of a liquid crystal. Such ultraviolet-ray absorbing ability may be obtained by making a cellulose derivative to include a material which absorbs ultraviolet rays, or by providing a layer with ultraviolet-ray absorbing ability on a film which consists of a cellulose derivative.

As UV absorber with such ultraviolet-ray absorbing ability, an absorber excelling in the absorbing power for ultraviolet rays with a wavelength of 370 nm or less and having few absorption for a visible ray with a wavelength of 400 nm or more may be used preferably. As an example of the UV absorber used preferably, although for example a triazine type compound, an oxi-benzophenone type compound, a benzotriazole type compound, a salicylate type compound, a benzophenone type compound, a cyanoacrylate type compound, a nickel complex salt type compound, etc. are may be listed, it is not limited to these. Moreover, a macromolecule UV absorber described in a official gazette of TOKKAIHEI No. 6-148430 may be also preferably used.

As an example of a UV absorber useful in the present invention, 2-(2'-hydroxy-5'-methylphenyl)benzotriazole, 2-(2'-hydroxy-3' and 5'-di-tert-butylphenyl)benzotriazole, 2-(2'-hydroxy-3'-tert-butyl-5'-methylphenyl)benzotriazole, 2-(2'-hydroxy-3' and 5'-di-tert-butylphenyl)-5-chloro benzotriazole, 2-(2'-hydroxy-3'-(3",4",5"6"-tetra-hydronalium phthalimide methyl)-5'-methylphenyl)benzotriazole, 2 and 2-methylene bis(4-(1,1,3, and 3-tetra-methyl butyl)-6-(2H-benzotriazole-2-yl) phenol), 2-(2'-hydroxy-3'-tert-butyl-5'-methylphenyl)-5-chloro benzotriazole, 2-(2H-benzotriazole-2-yl)-6-(normal chain and side chain dodecyl)-4-methyl phenol <<Tinuvin(TINUVIN)171>>, 2-octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl] mixture of propionate <<Tinuvin (TINUVIN)109>>, 2-(2H-benzotriazole-2 yl)-4, 6-bis(1-methyl-1-phenyl ethyl) phenol <<Tinuvin 234>>, 2-(3-t-butyl-5-methyl-2 hydroxyphenyl)-5-chloro-benzotriazole <<Tinuvin 326>> etc. may be listed, however, it is not limited to these. Moreover, each Tinuvins of above-mentioned Tinuvins 109, Tinuvins 171, and Tinuvin 326 is a product of Chiba Specialty Chemicals Co., and can be used preferably.

As an example of a benzophenone type compound, although 2,4-dihydroxy benzophenone, 2, and 2'-dihydroxy-4-methoxybenzophenone, 2-hydroxy-4-methoxy-5-sulfo benzophenone, bis(2-methoxy-4-hydroxy-5-benzoyl phenyl methane), etc. may be listed, it is not limited to these.

Moreover, since the UV absorber which can be used for a retardation film in the present invention is excellent also in the coating characteristics of various coating layers, it is desirable to contain UV absorbers with the distribution coefficient of 9.2 or more described in Japanese Patent O.P.I. Publication No. 2000-187825, and especially it is desirable to use UV absorbers with the distribution coefficient of 10.1 or more.

Moreover, a macromolecule UV absorber (or ultraviolet-ray absorptivity polymer) described in TOKKAIHEI No. 6-148430 and Japanese Patent O.P.I. Publication No. No. 2002-47357 can be used preferably. A macromolecule UV absorber described in general formula (1) or general formula (2) of Japanese Patent O.P.I. Publication No. 6-148430, or general formulas (3), (6), and (7) in Japanese Patent O.P.I. Publication No. 2002-47357, can be used especially preferably.

Moreover, a compound having 1, 3, and 5-triazine ring can be preferably used as a UV absorber for a retardation film of the present invention. This compound can be used also as a retardation regulator.

As an added amount of these compounds, an added amount of 0.1 to 5.0% at a mass rate to a cellulose derivative is desirable, and 0.5 to 1.5% is still more desirable.

(Antioxidant)

An antioxidant is also called antidegradant. When a liquid crystal image display device etc. is placed in the state of high humidity high temperature, deterioration of a retardation film may occur. Since, for example, an antioxidant has a function which delays or prevents a retardation film from decompositioning by halogen in residual solvents in the retardation film, or by phosphoric acid of a phosphoric acid type plasticizer, etc., it is desirable to make it contain in the above-mentioned retardation film.

As such an antioxidant, a hindered-phenol type compound is used preferably. For example, 2,6-di-t-butyl-p-cresol, a penta ERIS retail-tetrakis [3-(3,5-di-t-butyl-4 hydroxyphenyl)propionate], triethylene glycol-bis [3-(3-t-butyl-5-methyl-4 hydroxyphenyl)propionate], 1,6-dihydroxyhexane-bis [3-(3,5-di-t-butyl-4 hydroxyphenyl)propionate], 2 and 4-bis-(n-octylthio)-6-(4-hydroxy-3,5-di-t-butyl anilino)-1,3, and 5-triazine, 2 and 2-chio-diethylenebis[3-(3,5-di-t-butyl-4 hydroxyphenyl)propionate], Octadecyl-3-(3,5-di-t-butyl-4 hydroxyphenyl)propionate, N and N'-hexamethylene bis(3, 5-di-t-butyl-4-hydroxy-hydrocinnamide), 1, 3, and 5-trimethyl-2,4,6-tris(3,5-di-t-butyl-4-hydroxy benzyl)benzene, tris-(3,5-di-t-butyl-4-hydroxy benzyl)-isocyanurate, etc. may be listed. In particular, 2,6-di-t-butyl-p-cresol, a penta eris-retil-tetrakis[3-(3,5-di-t-butyl-4 hydroxyphenyl)propionate], and a triethylene glycol-bis[3-(3-t-butyl-5-methyl-4 hydroxyphenyl)propionate] are desirable. Moreover, for example, phosphorus type processing stabilizers, such as metal deactivator of hydrazine types, such as an N and N'-bis[3-(3,5-di-t-butyl-4 hydroxyphenyl)propionyl] hydrazine, and tris(2,4-di-t-butylphenyl)phosphight may be used together.

As an added amount of these compound, an added amount of 1 ppm to 1.0% at a mass rate to a cellulose derivative is desirable, and 10-1000 ppm are still more desirable.

(Matting Agent)

In the cellulose derivative in the present invention, in order to give sliding property, a matting agent such as fine particles can be added. As the fine particles, fine particles of an inorganic compound or fine particles of an organic compound may be listed up.

As an added amount of fine particles, an amount of 0.01-1.0 g per an area of 1 m² of a retardation film are desirable, 0.03-0.5 g are more desirable, and 0.08-0.3 g are still more desirable. With this, it is desirable to form a convex of 0.1-1-micrometer on a surface of a retardation film, and sliding property is given to the film.

As fine particles added in a retardation film, a silicon dioxide, titanium dioxide, aluminium oxide, zirconium oxide, calcium carbonate, calcium carbonate, talc, clay, a baked caolin, a baked calcium silicate, hydration silicic acid calcium, aluminium silicate, magnesium silicate, and calcium phosphate can be mentioned as an example of an inorganic compound. Since turbidity becomes low and the haze of a film can be made small, particles containing silicon is desirable, and especially a silicon dioxide is desirable.

Fine particles like a silicon dioxide is subjected to a surface treatment with an organic substance in many cases. It is desirable that those fine particles can make the haze of a film small. As a desirable organic substance in the surface treatment, halo silane, alkoxy silane, silazane, siloxane, etc. can be mentioned.

Silicon dioxide fine particles can be obtained, for example, by burning a mixture of vaporized silicon tetrachloride and hydrogen in air at 1000-1200° C.

Fine particles of a silicon dioxide having a primary average grain diameter of 20 nm or less and an apparent specific gravity of 70 or more g/L are desirable. Particles having a primary average grain diameter of 5-16 nm are more desirable. Particles having a primary average grain diameter of 5-12 nm are still more desirable.

These fine particles provide sliding property by forming a secondary aggregate in a film and forming unevenness in a film surface. A smaller average diameter of primary particles is desirable, because a haze is low. An apparent specific gravity of 90-200 g/L or more is more desirable, and 100-200 g/L or more is more desirable. A lager apparent specific gravity is desirable, because it becomes possible to make high-concentration fine particle dispersion liquid, and an occurrence of a haze and a big coagulum is few. Suppose that a liter is expressed with L in the present invention.

As fine particles of a desirable silicon dioxide, fine particles marketed by product names of aerosil R972, R972V, R974 and R812, 200, 200V and 300, R202, OX50, and TT600 (manufactured by Japanese Aerosil Co.) can be mentioned, for example. Aerosil 200V, R972, R972V, and R974, R202 and R812 can be used preferably. As fine particleses of zirconium oxide, fine particles marketed by product names of aerosils R976 and R811 (manufactured by Japanese Aerosil Co.) can be used, for example.

Among the above fine particles, aerosil 200V, aerosil R972V, and aerosil TT600 are especially desirable, because the effect that they make the turbidity of a retardation film of the present invention lower and make a friction factor lower is larger.

As an example of fine particles of an organic compound, a silicone resin, a fluorine plastic, and acryl resin can be mentioned. Among them, a silicone resin is desirable, and especially fine particles having a three dimensional network structure are desirable, for example, toss pearl 103, toss pearl 105, toss pearl 108, toss pearl 120, toss pearl 145, toss pearl 3120 and toss pearl 240 (manufactured by Toshiba Silicone Co.) can be mentioned.

In measurement of a primary average grain diameter of fine particles, particles are observed with a transmission electron microscope (magnification of 500,000 to 2000,000) so as to obtain grain diameters of 100 particles, and a primary average grain diameter is obtained by calculating the average value of the grain diameters.

Moreover, the apparent specific gravity of the above-mentioned description can be calculated by the following formula in which a weight is measured by taking a fixed quantity of silicon dioxide fine particles in a measuring cylinder.

Apparent specific gravity (g/L)=the mass (g) of silicon dioxide/the volume (L) of silicon dioxide Moreover, it is also desirable to form a layer containing fine particles on a surface of the retardation film of the present invention by coating, without making fine particles contained in a dope solution. A type of fine particles is not limited specifically, but fine particles capable of being added in the above-mentioned dope solution can be used, and especially silicon oxide can be used preferably. The layer containing fine particles is a layer which has a layer thickness of 0.05 to 5 μm and contains about 0.1 to 50% by weight of fine particles whose average particle diameter is 0.01-0.3 μm. As a binder, a cellulose ester resin, such as cellulose triacetate, cellulose diacetate, cellulose acetate propionate and cellulose acetate butyrate, an acryl resin, etc. are preferably used. The coating solvent is not specifically limited, but a solvent capable of being used for a dope solution is used preferably. The layer containing fine particles is preferably provided during film formation or before winding film after film formation, also it can be provided after film has been once winded.

<Film Production (Film Formation 9>

Hereafter, a desirable film-production method of a retardation film according to the present invention is explained.

1) Dissolution Process:

In this process, cellulose ester is dissolved in an organic solvent which mainly contains good solvent, in a vessel while stirring a mixture of a cellulose ester, an additive and a solvent so as to form a dope or an additive solution is mixed in a cellulose derivative solution so as to form a dope.

As a method of dissolving a cellulose derivative by ordinary pressure, although various methods such as a method of performing under the ambient pressure, a method of performing under a temperature below the boiling point of the main solvent, a method of performing under a temperature above the boiling point of the main solvent while applying a pressure, a method of performing a cooling dissolving method described in the official gazettes of Japanese Patent O.P.I. Publication No. 9-95544, Japanese Patent O.P.I. Publication No. 9-95557 and Japanese Patent O.P.I. Publication No. 9-95538, a method of performing under a high pressure described in the official gazette of Japanese Patent O.P.I. Publication No. 11-21379 can be employed, a method of performing under a temperature above the boiling point of the main solvent while applying a pressure especially is desirable.

The concentration of the cellulose derivative in a dope is desirably 10-35% by mass. The concentration of a solid component in a dope is preferably adjusted to be 15% by mass or more, especially preferable to be 18% to 35% by mass.

If the concentration of a solid component in a dope is too high, the viscosity of the dope becomes too high, thereby causing sharkskin so that a flatness of a film may be deteriorated. Accordingly, 35% by mass or less is desirable.

The viscosity of a dope is preferably adjusted to be within a range of 10 to 50 Pa·s.

As a dissolving method, there are various dissolving methods, such as a method of performing under an ordinary pressure, a method of performing under a temperature below the boiling point of a desirable organic solvent (namely, good solvent), a method of performing under an added pressure and a temperature above the boiling point of the above-mentioned good solvent, a method of performing with a cooling dissolving method, and a method of performing with a high pressure, and so on. As a dissolving method by adding a pressure not to cause boiling under a temperature above the boiling point of a good solvent, by adding a pressure to 0.11 to 1.50 MPa under a temperature of 40.4 to 120° C., it may be possible to dissolve in a short time by suppressing forming.

Instead of a cellulose derivative, a recycled material of a cellulose ester film may be used. The recycled material is a material such as film-cut chips of a film end which are produced at a film manufacturing process and do not become a product. The used ratio of the recycled material may be preferably 0 to 70% by weight to a solid component of formula values such as a main dope solution, more preferably 10 to 50% by weigh, still more preferably 20 to 40% by weight. The more the used amount of the recycled material is, the more excellent a filtering ability becomes, on the other hand, the fewer the used amount of the recycled material is, the more excellent a sliding ability becomes. Therefore, it is preferable to make the used ratio within the above range.

When using the recycled material, an amount of additives included in cellulose ester film, such as a plasticizer, a UV absorber, fine particles may be reduced in accordance with a used amount of the recycled material such that a final composition of a cellulose ester film is adjusted to become designed values.

A solvent used at the time of producing a main dope, as far as a solvent can dissolve a cellulose ester, the solvent is not restricted. Further, even if a solvent can not dissolve it with itself solely, if the solvent can dissolve it when the solvent is mixed with other solvent, the solvent can be used. Generally, it is preferable to use a mixed solvent of a methylene chloride being a good solvent and a cellulose ester being a poor solvent and to contain the poor solvent of 4 to 35% by weight in the mixed solvent.

In addition, as a usable good solvent, for example, methylene chloride, methyl acetate, ethylacetate, amyl acetate, methyl acetoacetate, acetone, tetrahydrofuran, 1,3-dioxolane, 1,4-dioxane, cyclohexanone, ethyl formate, 2,2,2-trifluoro ethanol, 2,2,3,3-tetrafluoro-1-propanol, 1,3-difluoro-2-propanol, 1,1,1,3,3, and 3-hexafluoro-2-methyl-2-propanol, 1,1,1,3,3, and 3-hexafluoro-2-propanol, 2,2,3 and 3, and 3-pentafluoro-1-propanol, nitroethane, 1, and 3-dimethyl-2-imidzolinon etc. may be employed, however, organic halogenated compounds, such as methylene chloride, a dioxysolan derivative, methyl acetate, an ethylacetate, acetone, methyl acetoacetate, etc. may be listed up as a desirable organic solvent (namely, good solvent).

As a poor solvent of cellulose ester, for example, an alcohol having a carbon number of 1-8, such as methanol, ethanol, n-propanol, iso-propanol, n-butanol, sec-butanol, and tert-butanol, methyl ethyl ketone, methyl isobutyl ketone, an ethylacetate, propyl acetate, mono-chloro benzene, benzene, cyclohexane, tetrahydrofuran, methyl cellosolve, ethylene glycol monomethyl ether, etc. can be mentioned. These poor solvents may be used solely or as a mixture combined two or more solvents appropriately.

After dissolving, it may be preferable to filtrate the resultant cellulose ester solution (dope) with a filter, to remove bubbles and to send a next process by a pump. At this time, in the dope, a plasticizer, an antioxidant and so on may be preferably added.

These additives may be added together with a cellulose ester or a solvent at the time of preparing a cellulose ester solution or a during preparing or after preparing the solution.

By using thus obtained dope, a cellulose ester film can be obtained through a casting process explained hereafter.

2) Casting Process:

In this casting process, a dope solution is sent to a high pressure die using a feeding pump (for example, a high pressure metering gear pump) and cast on an endless metal belt, for example, a stainless steel belt, or on a rotating cylindrical metal support at a prescribed position from the high pressure die.

A pressure die is preferable since uniform thickness is more easily obtained by adjusting the slit shape at the tip of a die. A pressure die includes a coat-hanger die and a T die either of which are preferably used. Two pressure dies may be provided simultaneously on a metal support to increase the film forming rate by dividing the amount of dope and by superimposing two film layers. Or it is also desirable to obtain a film of a laminated structure by a multi casting method to conduct casting of plural dope solutions simultaneously.

3) Solvent Evaporation Process:

A web (a film of a dope after the dope is cast on a metal support is referred to as a web) is heated on a metal support to evaporate the contained solvent until the web becomes peelable.

The following methods may be used to promote evaporation of a solvent from a web: blowing from above the web;

heating a metal support from a back surface using a liquid heat medium; and heating from both surfaces of a web using radiant heat. Among these methods, the method to heat a metal support from a back surface using a liquid heat medium is preferable with respect to drying efficiency, however the above methods may also be used in combination. In the case of heating a back surface using a liquid heat medium, it may be preferable to heat at a temperature lower than the boiling point of the main solvent of an organic solvent used in the dope or lower than the boiling point of an organic solvent having a lowest boiling point.

4) Peeling Process

A web dried on a metal support is peeled from the metal support at a prescribed position. The peeled web is sent to the next process. If the amount of the residual solvent (below mentioned formula) in a web is too much at the point of peeling, peeling is difficult and if the amount of the residual solvent is too small, partial peeling of the web may occur prior to the point of peeling.

As an alternate method to increase the formation rate of a web (by peeling while an amount of the residual solvent is as much as possible, the formation rate of a web can be increased), a gel casting method may be used. This method enables a higher forming rate of a web since a web is peeled while the web still contains a high percentage of solvent. In a gel casting method, the gel is formed by: adding a considerable amount of a poor solvent in a dope which forms a gel after casting the dope on a metal support; or lowering the temperature of the metal support to facilitate formation of a gel. By forming a gel, the mechanical strength of a web increases and an early peeling of the web becomes possible, resulting in a higher web formation rate.

With regard to the amount of the residual solvent on the metal support, it may be preferable to peel the web in a range of 5 to 150% by mass depending on the degree of a drying condition and a length of the metal support. In the case of peeling it when the amount of the residual solvent is too much, if the web is to soft, the web may lose a flatness at the time of peeling, or apt to cause twist or longitudinal streak by the peeling tension. Accordingly, the amount of the residual solvent when peeling is determined in view of both of an economic speed and a quality.

In the present invention, the temperature at the point of peeling from the metal support is preferably controlled between −50° C. and 40° C., is more preferably 10° C. to 40° C., and is still more preferably 15° C. to 30° C.

The amount of residual solvent at the point of peeling on the metal support is preferably 10 to 150% by weight, is more preferably 10 to 120% by weight.

The amount of the residual solvent is defined by the following equation:

$$\text{Residual solvent content (\% by weight)} = \{(M-N)/N\} \times 100$$

where M represents weight of samples of the web taken during or after the manufacturing process, and N represents weight of the same sample after it has been dried at 115° C. for one hour.

5) Drying and Stretching Process:

After peeling, the web is dried using a drying equipment which conveys the web by passing it alternately among a plurality of rolls arranged in the drying equipment, and/or a tenter apparatus which clips the both ends of a web and conveys it with a clip, thereby drying the web.

In the present invention, it is desirable to stretch using a tenter apparatus as a method of stretching 1.0 to 2.0 times to in a width direction between clips.

Furthermore, biaxial stretching in a longitudinal direction and a transverse direction are preferable. In the biaxial stretching, by slacking to 0.8 to 1.0 times in the longitudinal direction, a desired retardation value can be obtained.

The retardation film of the present invention preferably has the following retardation value for light having a wavelength of 590 nm under a condition of temperature of 23° C. and humidity of 55% RH: an in-plane retardation value $R_o$ represented by Formula (i) is within a range of 20 to 80 nm, a thickness-direction retardation value Rt represented by Formula (ii) is within a range of 100 to 250 nm and a ratio of $R_t/R_o$ is 2.0 to 5.0.

Retardation values (Ro) and (Rt) are represented by the following formulae.

$$Ro = (nx - ny) \times d \qquad \text{Formula (i):}$$

$$Rt = ((nx + ny)/2 - nz) \times d \qquad \text{Formula (ii):}$$

(Here, nx represents a refractive index in a film in-plane slow axis direction, ny represents a refractive index in a direction perpendicular to the slow axis, nz represents a refractive index in a film thickness direction, and d represents a film thickness.)

A temperature at the time of stretching is 80 to 180° C., preferably 90 to 160° C., an amount of remaining solvent at the time of stretching is 5 to 40% by weight, preferably 10 to 30% by weight.

With the above, it is possible to provide a retardation film having a stable display appearance quality with little change of Ro and Rt under conditions on which humidity is changed.

A general method of drying is to blow hot air on both surfaces of the web, however, a method to apply microwave is also possible. Too fast drying rate tends to result in loss of flatness of a web in the final stages of production. Usually, drying is carried out between 40 and 250° C. Drying temperature, amount of airflow, and drying duration depend on the type of solvent used in the web. Drying conditions may be appropriately selected depending on the type or the combination of solvent.

Although the thickness of a film is not limited specifically to a specific one, for example, a film having an optional thickness from 10 µm to 1 mm can be produced. Preferably, a thickness after a process such as drying and stretching have been completed is 10 to 500 µm, more preferably, 30 to 120 µm, more preferably, 30 to 80 µm.

(A polarizing Plate and a Liquid Crystal Display)

A retardation film of the present invention has an excellent viewing angle compensation function and has improved a humidity dependence of a viewing angle compensation function and a viewing angle compensation function, whereby the retardation film can be used as a polarizer protection film, and also can be used as an optical compensation film to magnify the viewing angle of a liquid crystal display while maintaining a stable performance.

A polarizing plate of the present invention is explained.

The polarizing plate of the present invention is producible by a general method. For example, after carrying out an alkali saponification process for a cellulose ester film, there is a method of using a full saponification type polyvinyl-alcohol aqueous solution and sticking them on double surfaces of a polarizer. The alkali saponification process is a process to soak a cellulose ester film into a hot strong alkali liquid in order to improve the wetting of a water base adhesives and to raise adhesion property.

As a polarizer used for a polarizing plate of the present invention, a well-known polarizer may be used. For example, a polarizer obtained by processing with a dichromatic dye such as iodine and stretching a film composed of a hydrophilic polymer such as an ethylene-modified polyvinyl alcohol which contains a polyvinyl alcohol or an ethylene unit in an amount of 1 to 4 mol and has a polymerization degree of 2000 to 4000 and a saponification degree of 99.0 to 99.99, or a polarizer obtained by processing so as orient a plastic film such as vinyl chloride may be employed. The thickness of a polarizer may be preferably 5 to 30 μm. The thus obtained polarizer is pasted with a cellulose ester film.

At this time, a retardation film of the present invention is used at least one of the cellulose ester film. Another cellulose ester film can be used for another surface. The cellulose ester film manufactured for a retardation film of the present invention may be used for the another surface, or a commercially available cellulose ester film (for example, Konica Minolta TAC, KC8UX, KC4UX, KC5UX, KC8UCR3, KC8UCR4, KC8UCR5, KC8UY, KC4UY, KC12UR, KC4UE, KC8UE, KC8UY-HA, KC8UX-RHA, KC8UXW-RHA-C, KC8UXW-RHA-NC, KC4UXW-RHA-NC, (manufactured by Konica Minolta OPT Inc.)) may be used as a polarizing plate protection film of another surface of a surface side.

It is desirable that the polarizer protection-film used for a surface side of a display device includes an antirelection layer, an antistatic coating and an antipollution layer besides anti-glaring layer or a clear hard coat layer.

The polarizing plate of the present invention obtained as mentioned above can be arranged so at to be pasted on double surfaces of liquid crystal cell, whereby a liquid crystal display of the present invention can be produced.

Moreover, at the time of production of a polarizing plate, it is desirable to carry out a lamination so that a in-plane slow axis of a retardation film of the present invention and a transmission axis of a polarizer are parallel or may intersect perpendicularly. In this case, it is especially preferable in the sense of manufacture that a long-roll film is used so as to paste roll to roll. With this, light leakage at the time of a black indication is improved remarkably and even if a liquid crystal display is has a big screen more than 15 type, preferably more than 19 type, there is no white omission in a screen periphery section. Further, even under an environment that humidity change is large, stable viewing angle characteristics with its effect are maintained for a long period of time. Especially, a prominent effect is observed on a MVA (multi domain vertical alignment) type liquid crystal display. Moreover, the viewing angle characteristics of a liquid crystal display which employs various drive systems, such as TN, VA, OCB, and HAN, can be optimized.

EMBODIMENT

Below will be explained some preferred embodiments to illustrate the invention. However, it is to be understood that the invention is not intended to be limited to the specific embodiments.

Embodiment 1

First will be explained a method of measuring Ro and Rt.

Average refraction indexes of film components were measured by an Abbe refractometer (4T) and film thicknesses were measured by a micrometerin the marketplace.

Film samples were kept in a test environment of 23° C. and 55% RH for 24 hours, their retardations were measured at a wavelength of 590 nm by an automatic double refractometer KOBRA-21ADH (manufactured by Oji Scientific Instruments), the obtained average refraction index and film thickness values were assigned to the following equations, and in-plane retardation (Ro) and retardation (Rt) along the thickness of the film sample were calculated. At the same time, the directions of slow axes of the film samples were measured.

$$Ro=(nx-ny)\times d \qquad \text{Equation (i)}$$

$$Rt=((nx+ny)/2-nz)\times d \qquad \text{Equation (ii)}$$

(here, nx represents a refractive index in a film in-plane slow axis direction, ny represents a refractive index in a direction perpendicular to the slow axis, nz represents a refractive index in a film thickness direction, and d represents a film thickness.)

<<Preparation of Cellulose Ester Film 101>>

Table 1 shows cellulose ester, plasticizer, UV absorber, fine particles and solvent which were used in the example.

<Particle Dispersion Liquid>

| | |
|---|---|
| Particles (Aerosil R972V (manufactured by Japan Aerosil)) | 11 parts by mass |
| Ethanol | 89 parts by mass |

After stirring and mixing the above components for 50 minutes, the resultant mixture was dispersed with a Manthon Gaulin.

<Particle-Adding Solution>

The particle adding solution was prepared by taking the steps of adding a cellulose ester (shown below) into methylene chloride in a dissolution tank, heating the mixture until the cellulose ester is completely dissolved, filtering the solution by a filter paper Azumi #244 (manufactured by AZUMI FILTERPAPER CO., LTD), adding a particle dispersion liquid slowly into the filtrate (filtered cellulose ester solution) while stirring the solution, dispersing the solution by an attriter, filtering the dispersion liquid by Finemet NF (manufactured by Nippon Seisen Co., Ltd.), and obtaining a particle-added solution.

| | |
|---|---|
| Methylene chloride | 99 parts by mass |
| Cellulose ester (Cellulose acetate propionate: acetyl group substitution degree of 1.8, and propionyl group substitution degree of 0.7) | 4 parts by mass |
| Particle dispersion liquid | 11 parts by mass |

The main dope solution of the compositions shown below was prepared by taking the steps of putting methylene chloride and ethanol in a pressure dissolution tank, adding cellulose ester into the solvent mixture in the tank while stirring the mixture, heating the mixture until the cellulose ester is completely dissolved, adding a plasticizer and an ultraviolet absorber into the solution, filtering the solution by a filter paper Azumi #244 (manufactured by AZUMI FILTERPAPER CO., LTD), and thus obtaining the main dope solution.

Then, cellulose ester film 101 of 1.5 m wide with a knurled part of 1 cm wide and 8 μm high on each end was prepared by taking the steps of putting 100 parts (by mass) of main dope solution and 2 parts of particle added solution in Toray static in-line mixer Hi-Mixer SWJ (manufactured by Toray Industries, Inc.), fully mixing the solution, uniformly flow-casting the solution over a 2 m-wide stainless band support by the belt flow casting device, letting the solvent evaporating from the stainless band support until the quantity of solvent left on the support is 110%, stretching the resulting web with a tensile force to make the longitudinal stretching ratio (MD) 1.0 when separating the web from the stainless band support, clamping both ends of the web by a tenter, stretching the web at 130° C. with 20 mass % of residual solvent at the start of stretching to make the stretching ratio 1.3 in the cross direction (TD), holding the current stretching status for a few seconds (keeping the width constant), releasing the cross tensile force, passing the drawn web through a third drying zone at 125° C. for 30 minutes to dry the web, and thus obtaining the above cellulose ester film.

<Composition of the Main Doping Solution>

| | |
|---|---|
| Methylene chloride | 300 parts by mass |
| Ethanol | 60 parts by mass |
| Cellulose ester (cellulose acetate propionate: acetyl substitution degree of 1.8 and propionyl group substitution degree of 0.7) | 73 parts by mass |
| Additive 1 (exemplified compound 1 of a compound having a furanose structure or a pyranose structure according to the present invention (compound 1)) | 25 parts by mass |
| Ultraviolet absorber (TINUVIN 109 (manufactured by Ciba Specialty Chemicals)) | 1.3 parts by mass |
| Ultraviolet absorber (TINUVIN 171 (manufactured by Ciba Specialty Chemicals)) | 0.6 parts by mass |

<<Preparation of Cellulose Ester Films 102 to 125>>

Cellulose ester films 102 to 125 were prepared in the same conditions as cellulose ester film 101 except that a type and an added amount of the exemplified compound of a compound having a furanose structure or a pyranose structure according to the present invention, a type and an added amount of additive 2 (plasticizer), a substitution degree of a cellulose ester, an added amount (each added amount of cellulose ester was adjusted to become 100% by mass as a solid component), and stretching times were changed as shown in Table 1.

The prepared cellulose ester films 101 to 125 were evaluated as shown below.

<<Evaluation>>

(Fluctuation of Retardation Values Due to Humidity Change)

Retardation values of respective prepared cellulose ester films 101 to 125 were obtained by the abovementioned methods, and Rt(a) fluctuations were calculated from the obtained values.

The Rt(a) fluctuation was obtained by keeping film samples at 23° C. and 20% RH for 5 hours, measuring their refraction indexes Rt values (Rt(b)) in the same environment, keeping the same film samples at 23° C. and 80% RH for 5 hours, measuring their refraction indexes Rt values (Rt(c)) in the same environment, and assigning these values Rt(b) and Rt(c) to the Equations below.

$$Rt(a) = |Rt(b) - Rt(c)|$$

Further, the humidity-controlled film samples were kept again in the environment of 23° C. and 55% RH, measuring the retardation value of the film samples in the environment and confirmed that the fluctuation was a reversible fluctuation.

The evaluation results of the above are indicated in Table 1.

TABLE 1

| Cellulose ester film No. | Additive 1 | Added amount 1 parts by weight | Additive 2 | Added amount 2 parts by weight | Cellulose ester Acetyl group substitution degree | Propionyl group substitution degree | Total acyl group substitution degree |
|---|---|---|---|---|---|---|---|
| 101 | Compound 1 | 25 | — | — | 1.8 | 0.7 | 2.5 |
| 102 | Compound 1 | 25 | — | — | 1.8 | 0.7 | 2.5 |
| 103 | Compound 1 | 30 | — | — | 1.8 | 0.7 | 2.5 |
| 104 | Compound 1 | 35 | — | — | 1.8 | 0.7 | 2.5 |
| 105 | Compound 1 | 0 | — | — | 1.8 | 0.7 | 2.5 |
| 106 | Compound 1 | 5 | — | — | 1.8 | 0.7 | 2.5 |
| 107 | Compound 2 | 25 | — | — | 1.8 | 0.7 | 2.5 |
| 108 | Compound 3 | 25 | — | — | 1.8 | 0.7 | 2.5 |
| 109 | Compound 4 | 25 | — | — | 1.8 | 0.7 | 2.5 |
| 110 | Compound 5 | 25 | — | — | 1.8 | 0.7 | 2.5 |
| 111 | Compound 6 | 25 | — | — | 1.8 | 0.7 | 2.5 |
| 112 | Compound 7 | 25 | — | — | 1.8 | 0.7 | 2.5 |
| 113 | Compound 8 | 25 | — | — | 1.8 | 0.7 | 2.5 |
| 114 | Compound 9 | 25 | — | — | 1.8 | 0.7 | 2.5 |
| 115 | Compound 10 | 25 | — | — | 1.8 | 0.7 | 2.5 |
| 116 | Compound 1 | 15 | c | 10 | 1.4 | 1.0 | 2.4 |
| 117 | Compound 1 | 15 | d | 10 | 1.5 | 0.9 | 2.4 |
| 118 | Compound 1 | 15 | e | 10 | 1.6 | 0.8 | 2.4 |
| 119 | Compound 1 | 25 | — | — | 1.6 | 0.5 | 2.1 |
| 120 | Compound 1 | 25 | — | — | 1.6 | 0.6 | 2.2 |
| 121 | Compound 1 | 25 | — | — | 1.9 | 0.65 | 2.55 |
| 122 | Compound 1 | 25 | — | — | 2.0 | 0.7 | 2.7 |
| 123 | Compound 1 | 25 | — | — | 2.9 | — | 2.9 |
| 124 | a | 8.5 | b | 2 | 2.9 | — | 2.9 |
| 125 | a | 8.5 | b | 2 | 2.9 | — | 2.9 |

| Cellulose ester film No. | Stretching MD | Stretching TD | Thickness (μm) | Retardation value Ro | Retardation value Rt | Rt/Ro | *1 *2 | Remarks |
|---|---|---|---|---|---|---|---|---|
| 101 | 1.0 Times | 1.3 Times | 80 | 38 | 129 | 3.4 | 8 | Inventive |
| 102 | 1.0 Times | 1.4 Times | 40 | 20 | 80 | 4.0 | 5 | Inventive |
| 103 | 1.0 Times | 1.3 Times | 80 | 32 | 105 | 3.3 | 8 | Inventive |
| 104 | 1.0 Times | 1.3 Times | 80 | 27 | 60 | 2.2 | 5 | Inventive |

TABLE 1-continued

| | | | | | | | | |
|---|---|---|---|---|---|---|---|---|
| 105 | 1.0 Times | 1.3 Times | 80 | 47 | 261 | 5.6 | 32 | Comparative |
| 106 | 1.0 Times | 1.3 Times | 80 | 45 | 170 | 3.8 | 20 | Inventive |
| 107 | 1.0 Times | 1.3 Times | 80 | 25 | 112 | 4.5 | 13 | Inventive |
| 108 | 1.0 Times | 1.3 Times | 80 | 78 | 200 | 2.6 | 20 | Inventive |
| 109 | 1.0 Times | 1.3 Times | 80 | 30 | 120 | 4.0 | 16 | Inventive |
| 110 | 1.0 Times | 1.3 Times | 80 | 36 | 117 | 3.2 | 15 | Inventive |
| 111 | 1.0 Times | 1.3 Times | 80 | 18 | 80 | 4.4 | 15 | Inventive |
| 112 | 1.0 Times | 1.3 Times | 80 | 19 | 80 | 4.2 | 15 | Inventive |
| 113 | 1.0 Times | 1.3 Times | 80 | 36 | 125 | 3.5 | 15 | Inventive |
| 114 | 1.0 Times | 1.3 Times | 80 | 45 | 130 | 2.9 | 17 | Inventive |
| 115 | 1.0 Times | 1.3 Times | 80 | 40 | 135 | 3.4 | 16 | Inventive |
| 116 | 1.0 Times | 1.3 Times | 40 | 35 | 131 | 3.7 | 3 | Inventive |
| 117 | 1.0 Times | 1.3 Times | 40 | 33 | 128 | 3.9 | 5 | Inventive |
| 118 | 1.0 Times | 1.3 Times | 40 | 34 | 130 | 3.8 | 3 | Inventive |
| 119 | 1.0 Times | 1.3 Times | 80 | 70 | 230 | 3.3 | 15 | Inventive |
| 120 | 1.0 Times | 1.3 Times | 80 | 62 | 210 | 3.4 | 9 | Inventive |
| 121 | 1.0 Times | 1.3 Times | 80 | 33 | 105 | 3.2 | 7 | Inventive |
| 122 | 1.0 Times | 1.3 Times | 80 | 21 | 72 | 3.4 | 10 | Inventive |
| 123 | 1.0 Times | 1.0 Times | 80 | 1 | 3 | 3.2 | 5 | Reference |
| 124 | 1.1 Times | 1.1 Times | 80 | 2 | 60 | 40 | 30 | Comparative |
| 125 | 1.0 Times | 1.3 Times | 80 | 18 | 80 | 4.4 | 35 | Comparative | a: Triphenyl phosphate,
b: Ethyl phthalyl ethylene glycolate
c: Trimethylolpropane tribenzoate,
d: Acetyl tributyl citrate
e: Sample No. 1(aromatic terminal ester sample)
*1: Retardation humidity fluctuation,
*2: ΔRt(20%-80%)

It is judged that retardation films of 101 to 104, 106 to 123 according to the present invention are excellent, because a change in retardation value for a humidity change is small in comparison with comparative examples.

Embodiment 2

<<Preparation of Polarizing Plates>> polarizing plates were prepared from raw material samples of the above-prepared cellulose ester films 101 to 125 by an alkaline-saponification process.

<Alkaline Saponification Process>

| Saponification process: | 2M-NaOH | 50° C., 90 seconds |
|---|---|---|
| Rinse process: | Water | 30° C., 45 seconds |
| Neutralization process: | 10 mass % HCl | 30° C., 45 seconds |
| Rinse process: | Water | 30° C., 45 seconds |

After the saponification process, rinse, neutralisation, and rinse processes were conducted in that order, then the films were dried at 80° C.

<Preparation of Polarizer>

A long-length roll polyvinyl alcohol film with a thickness of 120 μm was immersed in 100 parts of an aqueous solution containing 1 part of iodine and 4 parts of a boric acid, and was stretched 5 times at 50° C. in a conveying direction and whereby a polarizing film was made.

Then, polarizing plates P101 to P126 were prepared by bonding alkaline-saponificated cellulose ester film 123 and 124 to one surface of the above polarizing film and bonding cellulose ester films 101 to 122 and 125 respectively to the opposite surface of the above polarizing film with an adhesive of 5% aqueous solution of fully-saponificated polyvinyl alcohol, and then drying them, whereby polarizing plates P101 to P126 were prepared.

Incidentally, a polarizing plate 127 was produced by pasting a cellulose film 124 on both surfaces of a polarizing film with the same manner.

<<Preparation of Liquid Crystal Display Devices>>

Liquid crystal display devices 101 to 126 were prepared by removing the previously pasted double-sided polarizing plates from Fujitsu 15" display units VL-150SD and attaching the prepared polarizing plates P101 to P126 and P127 respectively to the glass surfaces of the liquid crystal cells (VA type) with the structures as shown in Table 2

In this case, the pasting direction of the polarizing plate was conducted such that the absorbing axis was oriented to the same direction of that of the previously pasted polarizing plate and the liquid crystal devices 101 to 126 were prepared with combination shown in Table 2.

<Viewing Angle Fluctuation>

The viewing angles of liquid crystal display devices were measured by using ELDIM EZ-Contrast 160D under an environment of 23° C. and 55% RH. Subsequently, the viewing angles were measured in an environment of 23° C. and 20% RH, and further in an environment of 23° C. and 80% RH, and evaluated according to the following judgmental standard. Finally, the viewing angles of the liquid crystal display devices were measured once more in the environment of 23° C. and 55% RH and confirmed that the fluctuations were reversible fluctuations. In the above tests, the liquid crystal display devices were kept for 5 hours in respective environments to adapt themselves to the environments before measurement.

A: No viewing angle fluctuation found

B: Viewing angle fluctuation found was no problem for actual use

C: Some viewing angle fluctuations found

The results of evaluation are listed in Table 2.

TABLE 2

| Liquid crystal display device No. | Front side polarizing plate | | | | Reverse side polarizing plate | | | View angle deterioration | Remarks |
|---|---|---|---|---|---|---|---|---|---|
| | Polarizing plate No. | *2 (viewing side) | *1 | Liquid crystal cell | Polarizing plate No. | *3 | *2 (back-light side) | | |
| 101 | P101 | 124 | 101 | Liquid crystal cell | P101 | 101 | 124 | A | Inv. |
| 102 | P102 | 124 | 102 | Liquid crystal cell | P102 | 102 | 124 | A | Inv. |
| 103 | P103 | 124 | 103 | Liquid crystal cell | P103 | 103 | 124 | A | Inv. |
| 104 | P104 | 124 | 104 | Liquid crystal cell | P104 | 104 | 124 | B | Inv. |
| 105 | P127 | 124 | 124 | Liquid crystal cell | P105 | 105 | 124 | C | Comp. |
| 106 | P127 | 124 | 124 | Liquid crystal cell | P106 | 106 | 124 | B | Inv. |
| 107 | P107 | 124 | 107 | Liquid crystal cell | P107 | 107 | 124 | B | Inv. |
| 108 | P127 | 124 | 124 | Liquid crystal cell | P108 | 108 | 124 | B | Inv. |
| 109 | P109 | 124 | 109 | Liquid crystal cell | P109 | 109 | 124 | B | Inv. |
| 110 | P110 | 124 | 110 | Liquid crystal cell | P110 | 110 | 124 | B | Inv. |
| 111 | P111 | 124 | 111 | Liquid crystal cell | P111 | 111 | 124 | B | Inv. |
| 112 | P112 | 124 | 112 | Liquid crystal cell | P112 | 112 | 124 | B | Inv. |
| 113 | P113 | 124 | 113 | Liquid crystal cell | P113 | 113 | 124 | B | Inv. |
| 114 | P114 | 124 | 114 | Liquid crystal cell | P114 | 114 | 124 | B | Inv. |
| 115 | P115 | 124 | 115 | Liquid crystal cell | P115 | 115 | 124 | B | Inv. |
| 116 | P116 | 124 | 116 | Liquid crystal cell | P116 | 116 | 124 | A | Inv. |
| 117 | P117 | 124 | 117 | Liquid crystal cell | P117 | 117 | 124 | A | Inv. |
| 118 | P118 | 124 | 118 | Liquid crystal cell | P118 | 118 | 124 | A | Inv. |
| 119 | P127 | 124 | 124 | Liquid crystal cell | P119 | 119 | 124 | B | Inv. |
| 120 | P127 | 124 | 124 | Liquid crystal cell | P120 | 120 | 124 | A | Inv. |
| 121 | P121 | 124 | 121 | Liquid crystal cell | P121 | 121 | 124 | A | Inv. |
| 122 | P122 | 124 | 122 | Liquid crystal cell | P122 | 122 | 124 | B | Inv. |
| 123 | P123 | 124 | 125 | Liquid crystal cell | P123 | 125 | 124 | C | Comp. |
| 124 | P124 | 123 | 101 | Liquid crystal cell | P124 | 101 | 123 | A | Inv. |
| 125 | P125 | 123 | 116 | Liquid crystal cell | P125 | 116 | 123 | A | Inv. |
| 126 | P126 | 123 | 117 | Liquid crystal cell | P126 | 117 | 123 | A | Inv. |

*1: Retardation film or polarizing plate protective film (liquid crystal cell side)
*2: Polarizing plate protective film, Inv.: Inventive, Comp.: Comparative
*3: Inventive or comparative retardation film (liquid crystal cell side)

It is clear that the liquid crystal display devices 101 to 104, 106 to 122, 124 to 126 shows a very stable display function without causing a view angle fluctuation under a condition that humidity fluctuates, in comparison with the comparative liquid crystal display devices 105 and 123.

What is claimed is:
1. A stretched retardation film, containing:
a cellulose ester having a total acyl substitution degree of 2.1 to 2.55, and an acetyl substitution degree of 1.0 to 2.1; and
an esterified compound in which all or a part of OH groups in a compound (B) are esterified, wherein the compound (B) consists of two to three of at least one type of a furanose structure and a pyranose structure which are bonded in the compound (B),
wherein the stretched retardation film has a thickness of 30 to 80 μm and is stretched 1.0 to 2.0 times in a width direction so as to exhibit the following retardation values for light having a wavelength of 590 nm under a condition of a temperature of 23° C. and a humidity of 55% RH:
an in-plane retardation value Ro represented by a Formula (i) is 20 to 80 nm,
a thickness-direction retardation value Rt represented by a Formula (ii) is 100 to 250 nm and a ratio of Rt/Ro is 2.0 to 5.0, $$Ro=(nx-ny)\times d, \quad \text{Formula (i):}$$

$$Rt=((nx+ny)/2-nz)\times d, \quad \text{Formula (ii):}$$

wherein nx represents a refractive index in a film in-plane slow axis direction, ny represents a refractive index in a direction perpendicular to the slow axis, nz represents a refractive index in a film thickness direction, and d represents a film thickness in nm, wherein the retardation film has a variation of 3 to 20 nm in a thickness direction retardation value due to a humidity change between 20% RH and 80% RH at a temperature of 23° C. when the film has a thickness of 30 to 80 μm.

2. The stretched retardation film of claim 1, wherein the total acyl group substitution degree is 2.2 to 2.55.

3. The stretched retardation film of claim 1, wherein the retardation film contains 5 to 30% by weight of the esterified compound.

4. The stretched retardation film of claim 1, wherein the compound (B) is a compound having the furanose structure and the pyranose structure.

5. The stretched retardation film of claim 1, wherein the compound (B) is lactose, sucrose, nystose, 1F-fructosylnystose, stachyose, maltitol, lactitol, lactulose, cellobiose, maltose, cellotriose, maltotriose, raffinose or kestose.

6. The stretched retardation film of claim 5, wherein the compound (B) is sucrose.

7. A polarizing plate, comprising:
a polarizer; and
the stretched retardation film of claim 1 pasted on at least one surface of the polarizer.

8. A liquid crystal display device comprising:
a liquid crystal cell and
the polarizing plate of claim 7.

9. A liquid crystal display device, comprising:
a liquid crystal cell and
the stretched retardation film of claim 1.

10. The liquid crystal display device of claim 9, wherein the liquid crystal cell is a VA type liquid crystal cell.

* * * * *